United States Patent
Ibrahim et al.

(10) Patent No.: US 12,556,328 B2
(45) Date of Patent: Feb. 17, 2026

(54) PROCESSING TIME FOR WIDEBAND PRECODING IN SUBBAND FULL-DUPLEX

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 363 days.

(21) Appl. No.: 18/451,750

(22) Filed: Aug. 17, 2023

(65) Prior Publication Data
US 2025/0062871 A1 Feb. 20, 2025

(51) Int. Cl.
| | |
|---|---|
| *H04L 5/14* | (2006.01) |
| *H04L 5/00* | (2006.01) |
| *H04W 12/037* | (2021.01) |
| *H04W 72/04* | (2023.01) |
| *H04W 72/12* | (2023.01) |
| *H04W 72/1273* | (2023.01) |

(52) U.S. Cl.
CPC .............. *H04L 5/0048* (2013.01); *H04L 5/14* (2013.01); *H04W 72/1273* (2013.01)

(58) Field of Classification Search
None
See application file for complete search history.

(56) References Cited

U.S. PATENT DOCUMENTS

| | | | | |
|---|---|---|---|---|
| 11,032,765 | B2* | 6/2021 | Papasakellariou | H04L 5/0053 |
| 12,376,105 | B2* | 7/2025 | Li | H04L 1/1861 |
| 2012/0051310 | A1* | 3/2012 | Cho | H04W 72/04 370/329 |
| 2018/0270851 | A1* | 9/2018 | Bhattad | H04W 72/23 |
| 2018/0338307 | A1* | 11/2018 | Feng | H04W 72/56 |
| 2020/0059930 | A1* | 2/2020 | Lee | H04L 27/26025 |
| 2020/0229104 | A1* | 7/2020 | MolavianJazi | H04W 52/54 |
| 2021/0168770 | A1* | 6/2021 | Oh | H04W 72/23 |
| 2023/0224880 | A1* | 7/2023 | Xiong | H04L 5/0044 370/329 |
| 2023/0371039 | A1* | 11/2023 | Tsai | H04W 72/232 |

* cited by examiner

*Primary Examiner* — Sai Aung
(74) *Attorney, Agent, or Firm* — Holland & Hart LLP

(57) ABSTRACT

Methods, systems, and devices for wireless communication are described. A user equipment (UE) may receive a control message indicating a wideband precoding configuration for wideband precoding of two or more downlink subbands for subband full-duplex (SBFD) communication. The UE may receive grants scheduling a physical downlink shared channel (PDSCH) via two or more downlink subbands within an SBFD resource (e.g., a slot). Accordingly, the UE may receive downlink data via the two or more downlink subbands. The UE may process the downlink data and transmit, via a feedback (e.g., uplink) resource, a feedback message acknowledging the downlink data, where a time period between the SBFD resource and the feedback resource is based on the wideband precoding configuration and the grant scheduling the PDSCH via the two or more downlink subbands.

30 Claims, 16 Drawing Sheets

PROCESSING TIME FOR WIDEBAND PRECODING IN SUBBAND FULL-DUPLEX

TECHNICAL FIELD

The following relates to wireless communication, including configuring a processing time for wideband precoding in subband full-duplex (SBFD).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). Components within a wireless communication system may be coupled (for example, operatively, communicatively, functionally, electronically, and/or electrically) to each other.

SUMMARY

The described techniques relate to improved methods, systems, devices, and apparatuses that support configuring a processing time for wideband precoding in subband full-duplex. For example, the described techniques provide for modifying a processing time for processing downlink messages with wideband precoding enabled and in subband full-duplex (SBFD) scenarios. For example, a user equipment (UE) may receive a control message indicating a wideband precoding configuration for wideband precoding of two or more downlink subbands for SBFD communications. In addition, the UE may receive at least one grant scheduling a physical downlink shared channel (PDSCH) via the two or more downlink subbands within a same SBFD transmission time interval (TTI) (e.g., a slot). Based on the grant, the UE may receive a downlink message via the two or more downlink subbands of the PDSCH, and the UE may transmit a feedback message (e.g., a hybrid automatic repeat request (HARQ) acknowledgment (ACK)) in a feedback TTI for the downlink data. In such cases, a time offset between the SBFD TTI and the feedback TTI may be based on the wideband precoding configuration and the downlink data being scheduled in the two or more downlink subbands. That is, the UE may relax the processing timeline of the PDSCH in the SBFD slot based on the UE being scheduled with wideband precoding and based on the PDSCH being scheduled in two or more downlink subbands.

A method for wireless communications by a UE is described. The method may include receiving a control message indicating a wideband precoding configuration for wideband precoding of two or more downlink subbands for SBFD communication, receiving at least one grant scheduling a downlink shared channel via the two or more downlink subbands within a SBFD TTI, receiving, in accordance with the at least one grant, downlink data via the two or more downlink subbands of the downlink shared channel, and transmitting, via a feedback TTI, a feedback message for the downlink data, where a first time period between the SBFD TTI and the feedback TTI is based on the wideband precoding configuration and the at least one grant.

A UE for wireless communications is described. The UE may include at least one processor, and memory coupled (e.g., operatively, communicatively, functionally, electronically, or electrically) with the at least one processor. The memory may store instructions executable by the at least one processor (e.g., directly, indirectly, after pre-processing, without pre-processing) to cause the UE to receive a control message indicating a wideband precoding configuration for wideband precoding of two or more downlink subbands for SBFD communication, receive at least one grant scheduling a downlink shared channel via the two or more downlink subbands within a SBFD TTI, receive, in accordance with the at least one grant, downlink data via the two or more downlink subbands of the downlink shared channel, and transmit, via a feedback TTI, a feedback message for the downlink data, where a first time period between the SBFD TTI and the feedback TTI is based on the wideband precoding configuration and the at least one grant.

Another UE for wireless communications is described. The UE may include means for receiving a control message indicating a wideband precoding configuration for wideband precoding of two or more downlink subbands for SBFD communication, means for receiving at least one grant scheduling a downlink shared channel via the two or more downlink subbands within a SBFD TTI, means for receiving, in accordance with the at least one grant, downlink data via the two or more downlink subbands of the downlink shared channel, and means for transmitting, via a feedback TTI, a feedback message for the downlink data, where a first time period between the SBFD TTI and the feedback TTI is based on the wideband precoding configuration and the at least one grant.

A non-transitory computer-readable medium storing code for wireless communications is described. The code may include instructions executable by at least one processor (e.g., directly, indirectly, after pre-processing, without pre-processing) to receive a control message indicating a wideband precoding configuration for wideband precoding of two or more downlink subbands for SBFD communication, receive at least one grant scheduling a downlink shared channel via the two or more downlink subbands within a SBFD TTI, receive, in accordance with the at least one grant, downlink data via the two or more downlink subbands of the downlink shared channel, and transmit, via a feedback TTI, a feedback message for the downlink data, where a first time period between the SBFD TTI and the feedback TTI is based on the wideband precoding configuration and the at least one grant.

In some examples of the method, UEs, and non-transitory computer-readable medium described herein, a duration of the first time period may be calculated using a first non-zero value based on the wideband precoding configuration and the at least one grant.

In some examples of the method, UEs, and non-transitory computer-readable medium described herein, the first non-zero value may be based on a start symbol and an end symbol of the downlink shared channel within the SBFD TTI, a length of the downlink shared channel within the SBFD TTI in time, a location of one or more demodulation reference symbols within the SBFD TTI, a size of the downlink shared channel in each downlink subband of the two or more downlink subbands, or any combination thereof.

Some examples of the method, UEs, and non-transitory computer-readable medium described herein may further include operations, features, means, or instructions for transmitting a capability message indicating a capability of the UE to support adding a time offset to a second time period for determining a duration of the first time period.

In some examples of the method, UEs, and non-transitory computer-readable medium described herein, a time offset may be added to the first time period for determining a duration of the first time period based on the wideband precoding configuration and the at least one grant.

In some examples of the method, UEs, and non-transitory computer-readable medium described herein, receiving the control message may include operations, features, means, or instructions for receiving an indication that a second processing capability timeline may be enabled, where a first processing capability timeline may be applied for processing the downlink shared channel received via the two or more downlink subbands based on the wideband precoding configuration and the at least one grant.

In some examples of the method, UEs, and non-transitory computer-readable medium described herein, a first processing capability timeline may be applied for processing the downlink shared channel received via the two or more downlink subbands based on a quantity of resource blocks (RBs) within the SBFD TTI failing to satisfy a threshold.

In some examples of the method, UEs, and non-transitory computer-readable medium described herein, the quantity of RBs within the SBFD TTI includes a total quantity of scheduled RBs within the two or more downlink subbands.

In some examples of the method, UEs, and non-transitory computer-readable medium described herein, the quantity of RBs within the SBFD TTI includes a first quantity of scheduled RBs within a first downlink subband of the two or more downlink subbands and the first quantity may be greater than a second quantity of scheduled RBs within a second downlink subband of the two or more downlink subbands.

In some examples of the method, UEs, and non-transitory computer-readable medium described herein, a second time period between the SBFD TTI and the feedback TTI includes the first time period and a time offset based on the wideband precoding configuration and the at least one grant.

In some examples of the method, UEs, and non-transitory computer-readable medium described herein, a second time period between the SBFD TTI and the feedback TTI includes the first time period and a time offset for a set of multiple downlink shared channels within the SBFD TTI.

A method for wireless communications by a network entity is described. The method may include transmitting a control message indicating a wideband precoding configuration for wideband precoding of two or more downlink subbands for SBFD communication, transmitting at least one grant scheduling a downlink shared channel via the two or more downlink subbands within a SBFD TTI, transmitting, in accordance with the at least one grant, downlink data via the two or more downlink subbands of the downlink shared channel, and receiving, via a feedback TTI, a feedback message for the downlink data, where a first time period between the SBFD TTI and the feedback TTI is based on the wideband precoding configuration and the at least one grant.

A network entity for wireless communications is described. The network entity at least one processor, and memory coupled (e.g., operatively, communicatively, functionally, electronically, or electrically) with the at least one processor. The memory may store instructions executable by the at least one processor (e.g., directly, indirectly, after pre-processing, without pre-processing) to cause the network entity to transmit a control message indicating a wideband precoding configuration for wideband precoding of two or more downlink subbands for SBFD communication, transmit at least one grant scheduling a downlink shared channel via the two or more downlink subbands within a SBFD TTI, transmit, in accordance with the at least one grant, downlink data via the two or more downlink subbands of the downlink shared channel, and receive, via a feedback TTI, a feedback message for the downlink data, where a first time period between the SBFD TTI and the feedback TTI is based on the wideband precoding configuration and the at least one grant.

Another network entity for wireless communications is described. The network entity may include means for transmitting a control message indicating a wideband precoding configuration for wideband precoding of two or more downlink subbands for SBFD communication, means for transmitting at least one grant scheduling a downlink shared channel via the two or more downlink subbands within a SBFD TTI, means for transmitting, in accordance with the at least one grant, downlink data via the two or more downlink subbands of the downlink shared channel, and means for receiving, via a feedback TTI, a feedback message for the downlink data, where a first time period between the SBFD TTI and the feedback TTI is based on the wideband precoding configuration and the at least one grant.

A non-transitory computer-readable medium storing code for wireless communications is described. The code may include instructions executable by at least one processor (e.g., directly, indirectly, after pre-processing, without pre-processing) to transmit a control message indicating a wideband precoding configuration for wideband precoding of two or more downlink subbands for SBFD communication, transmit at least one grant scheduling a downlink shared channel via the two or more downlink subbands within a SBFD TTI, transmit, in accordance with the at least one grant, downlink data via the two or more downlink subbands of the downlink shared channel, and receive, via a feedback TTI, a feedback message for the downlink data, where a first time period between the SBFD TTI and the feedback TTI is based on the wideband precoding configuration and the at least one grant.

In some examples of the method, network entities, and non-transitory computer-readable medium described herein, a duration of the first time period may be calculated using a first non-zero value based on the wideband precoding configuration and the at least one grant.

In some examples of the method, network entities, and non-transitory computer-readable medium described herein, the first non-zero value may be based on a start symbol and an end symbol of the downlink shared channel within the SBFD TTI, a length of the downlink shared channel within the SBFD TTI in time, a location of one or more demodulation reference symbols within the SBFD TTI, a size of the downlink shared channel in each downlink subband of the two or more downlink subbands, or any combination thereof.

Some examples of the method, network entities, and non-transitory computer-readable medium described herein may further include operations, features, means, or instructions for receiving a capability message indicating a capability of a UE to support adding a time offset to a second time period for determining a duration of the first time period.

In some examples of the method, network entities, and non-transitory computer-readable medium described herein, a time offset may be added to the first time period for determining a duration of the first time period based on the wideband precoding configuration and the at least one grant.

In some examples of the method, network entities, and non-transitory computer-readable medium described herein, transmitting the control message may include operations, features, means, or instructions for transmitting an indication that a second processing capability timeline may be enabled, where a first processing capability timeline may be applied for processing the downlink shared channel received via the two or more downlink subbands based on the wideband precoding configuration and the at least one grant.

In some examples of the method, network entities, and non-transitory computer-readable medium described herein, a first processing capability timeline may be applied for processing the downlink shared channel received via the two or more downlink subbands based on a quantity of RBs within the SBFD TTI failing to satisfy a threshold.

In some examples of the method, network entities, and non-transitory computer-readable medium described herein, the quantity of RBs within the SBFD TTI includes a total quantity of scheduled RBs within the two or more downlink subbands.

In some examples of the method, network entities, and non-transitory computer-readable medium described herein, the quantity of RBs within the SBFD TTI includes a first quantity of scheduled RBs within a first downlink subband of the two or more downlink subbands and the first quantity may be greater than a second quantity of scheduled RBs within a second downlink subband of the two or more downlink subbands.

In some examples of the method, network entities, and non-transitory computer-readable medium described herein, a second time period between the SBFD TTI and the feedback TTI includes the first time period and a time offset based on the wideband precoding configuration and the at least one grant.

In some examples of the method, network entities, and non-transitory computer-readable medium described herein, a second time period between the SBFD TTI and the feedback TTI includes the first time period and a time offset for a set of multiple downlink shared channels within the SBFD TTI.

DETAILED DESCRIPTION

In some wireless communications systems, a user equipment (UE) may process a downlink message (e.g., received from a network entity or a base station) during a particular time period. For example, the UE may receive and process a downlink message over a processing time. After the duration of the processing time, the UE may transmit a feedback message acknowledging reception of the downlink message. In some examples, the UE may support subband full-duplex (SBFD) communications, where the UE may transmit and receive messages at the same time but via different frequency resources (e.g., different subbands of a slot). If wideband precoding within each downlink subband of a slot is enabled, the UE may use a longer processing timeline to process a downlink message because it may take longer to process two downlink subbands compared to a single downlink subband. In addition, the downlink message may include more data based on the two or more downlink subbands and based on the wideband precoding being enabled, however the processing time may be too short for the UE to sufficiently process the data. As such, the UE may benefit from adjusting the processing time for processing downlink messages that are wideband precoded and transmitted via multiple downlink subbands.

The techniques described herein support modifying a processing time for wideband precoding in SBFD scenarios. For example, a UE may receive a control message indicating a wideband precoding configuration for wideband precoding of two or more downlink subbands for SBFD communications. In addition, the UE may receive at least one grant scheduling a physical downlink shared channel (PDSCH) via the two or more downlink subbands within a same SBFD transmission time interval (TTI) (e.g., a slot). Based on the grant, the UE may receive a downlink message via the two or more downlink subbands of the PDSCH, and the UE may transmit a feedback message (e.g., a hybrid automatic repeat request (HARQ) acknowledgment (ACK)) in a feedback TTI for the downlink data. In such cases, a time offset between the SBFD TTI and the feedback TTI may be based on the wideband precoding configuration and the downlink data being scheduled in the two or more downlink subbands. That is, the UE may relax the processing timeline of the PDSCH in the SBFD slot based on the UE being scheduled with wideband precoding and based on the PDSCH being scheduled in two or more downlink subbands.

Aspects of the disclosure are initially described in the context of wireless communications systems. Aspects of the disclosure are then described in the context of processing timelines and process flows. Aspects of the disclosure are further illustrated by and described with reference to apparatus diagrams, system diagrams, and flowcharts that relate to configuring a processing time for wideband precoding in subband full-duplex.

Figure 1:
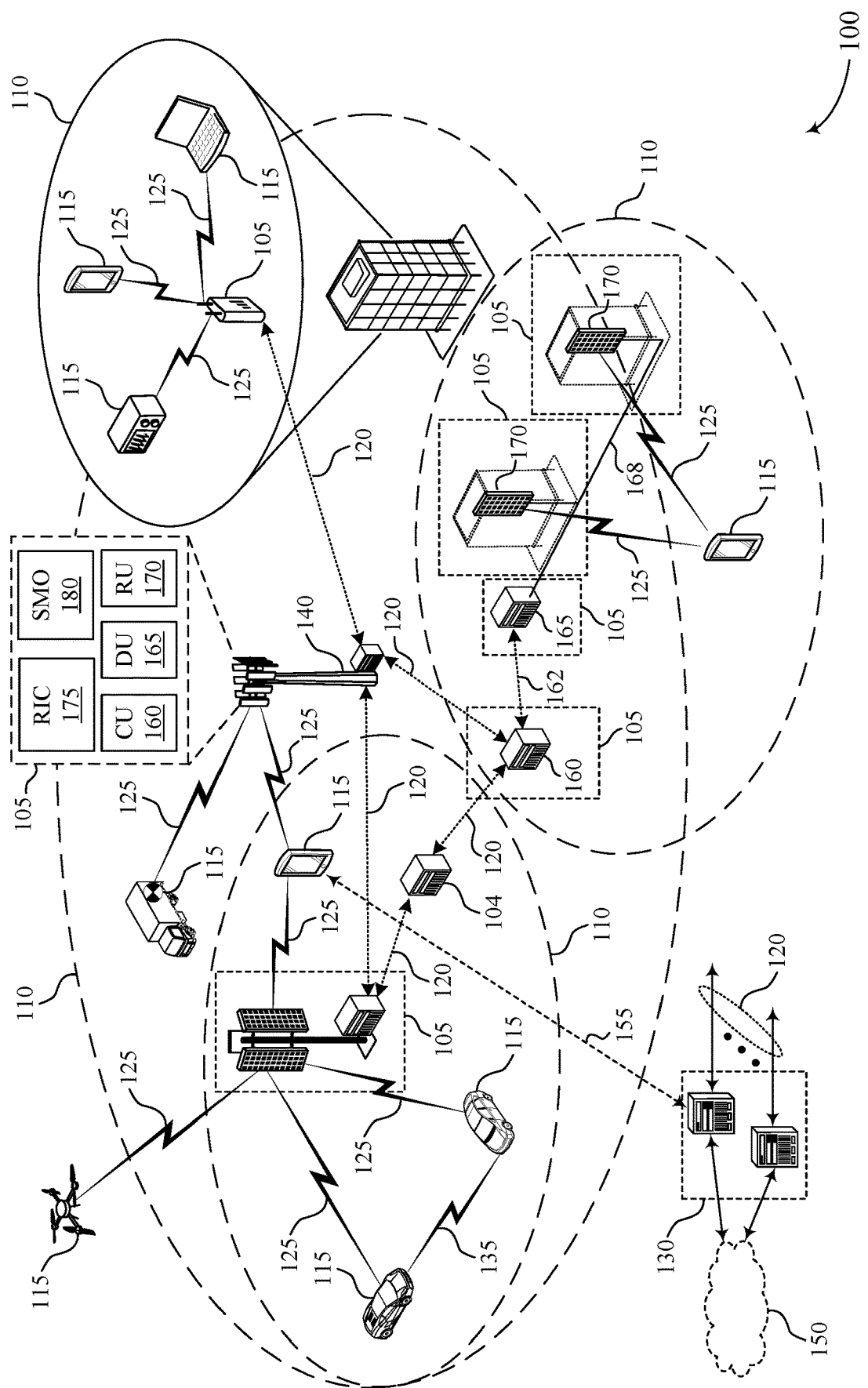
FIG. 1 shows an example of a wireless communications system that supports configuring a processing time for wideband precoding in subband full-duplex (SBFD) in accordance with one or more aspects of the present disclosure.

FIG. 1 shows an example of a wireless communications system 100 that supports configuring a processing time for wideband precoding in SBFD in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support configuring a processing time for wideband precoding in SBFD as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs, eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Some UEs 115 and network entities 105 may support full-duplex communication. For example, a UE 115 and a network entity 105 may support in-band full-duplex (IBFD) communications, where the UE 115 and the network entity 105 may transmit and receive via same time and frequency resources. In such cases, an uplink and a downlink may share a same INFD time/frequency resource (e.g., fully or partially overlapping). Alternatively, or additionally, the UE 115 and the network entity 105 may support SBFD (e.g., flexible duplex) communications, where the UE 115 and the network entity 105 may transmit and receive at the same time but on different frequency resources. That is, a downlink resource (e.g., a downlink subband of a slot) may be separated from an uplink resource (e.g., an uplink subband of a slot) in the frequency domain. For example, the downlink resource may be separated by the uplink resource by a guard band (such that the downlink and uplink resources are non-overlapping).

A slot format may be defined as a 'downlink+uplink' ('D+U') slot, which is a slot in which a frequency band may be used for both uplink and downlink transmissions. The uplink and downlink transmissions may occur in overlapping bands (e.g., IBFD) or adjacent bands (e.g., SBFD). In a given 'D+U' symbol, a half-duplex UE 115 may either transmit via the uplink band or receive via the downlink band. In addition, in a given 'D+U' symbol, a full-duplex UE 115 may transmit via the uplink band and/or receive via the downlink band in a same slot. In addition, a 'D+U' slot may include downlink-only symbols, uplink-only symbols, or full-duplex symbols.

In some examples, the network entity 105 may enable wideband precoding for a downlink message transmitted in an SBFD slot. In such cases, the wideband precoding may apply to a PDSCH in one downlink subband of the SBFD slot or in the two downlink subbands of the SBFD slot (e.g., two noncontiguous downlink subbands). In such cases, if a physical resource group (PRG) is determined as wideband, the UE 115 may support non-contiguous frequency resources across two downlink subbands but contiguous frequency resources within each downlink subband may be allocated. However, this may increase decoding complexity at the UE 115 as the UE 115 may process data received via each downlink subband separately in accordance with the wideband precoding.

The wireless communications system 100 may support an adjusted processing time for downlink messages with wideband precoding in SBFD scenarios. For example, a UE 115 may receive a control message indicating a wideband precoding configuration for wideband precoding of two or more downlink subbands for SBFD communications. In addition, the UE 115 may receive at least one grant scheduling a PDSCH via the two or more downlink subbands within a same SBFD TTI (e.g., a slot). Based on the grant, the UE 115 may receive a downlink message via the two or more downlink subbands of the PDSCH, and the UE 115 may transmit a feedback message (e.g., a HARQ-ACK) in a feedback TTI for the downlink data. In such cases, a time offset between the SBFD TTI and the feedback TTI may be based on the wideband precoding configuration and the downlink data being scheduled in the two or more downlink subbands. That is, the UE 115 may relax the processing timeline of the PDSCH in the SBFD slot based on the UE 115 being scheduled with wideband precoding and based on the PDSCH being scheduled on two or more downlink subbands.

Figure 2:
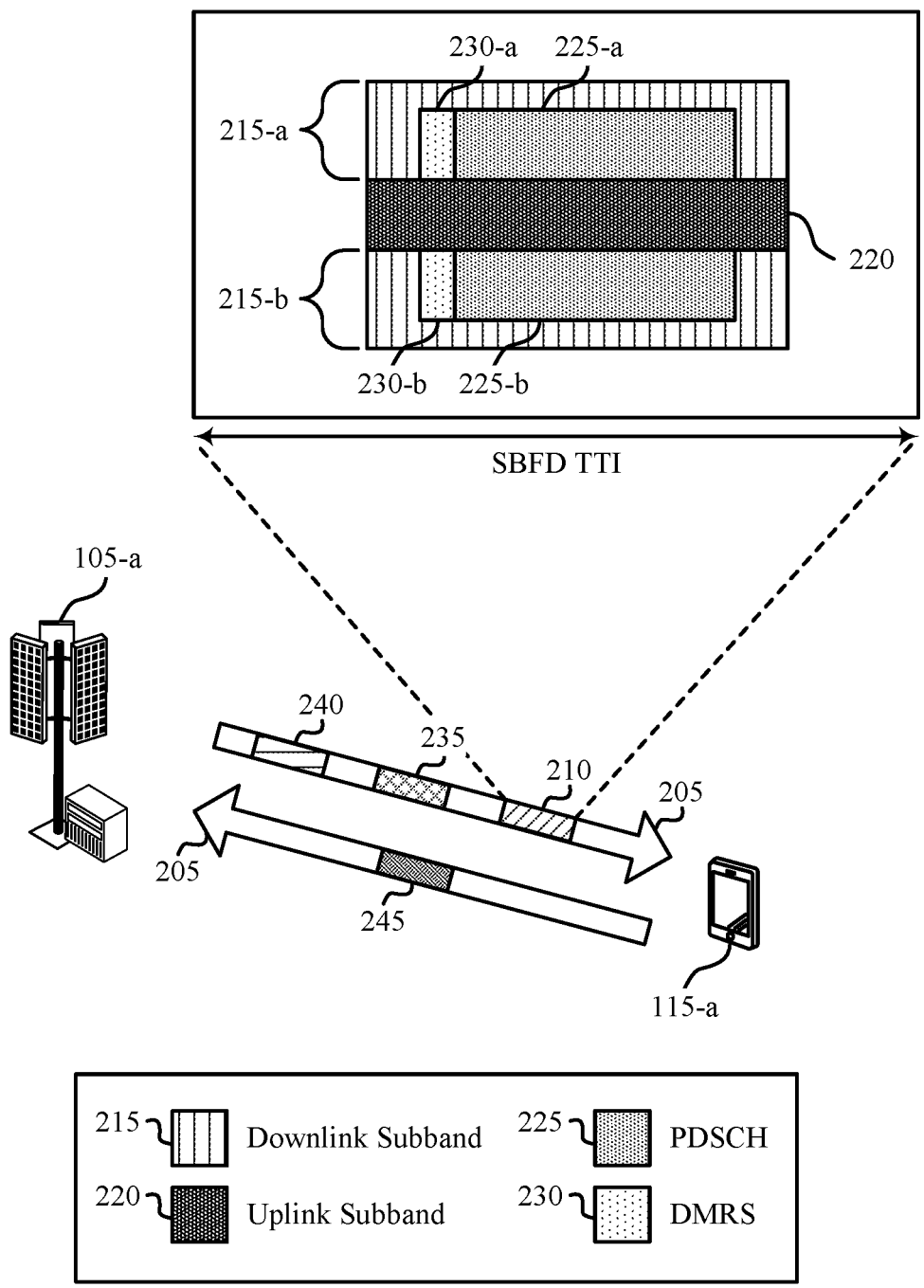
FIG. 2 shows an example of a wireless communication system that supports configuring a processing time for wideband precoding in SBFD in accordance with one or more aspects of the present disclosure.

FIG. 2 shows an example of a wireless communications system 200 that supports configuring a processing time for wideband precoding in SBFD in accordance with one or more aspects of the present disclosure. In some examples, the wireless communications system 200 may implement aspects of the wireless communications system 100 or may be implemented by aspects of the wireless communications system 100. For example, the wireless communications system 200 may include a UE 115-a and a network entity 105-a, which may be examples of corresponding devices described herein. The UE 115-a and the network entity 105-a may support adjusted PDSCH processing times for wideband precoded downlink messages in SBFD scenarios.

The UE 115-a and the network entity 105-a may communicate uplink and downlink communications via respective wireless communication links 205, which may be examples of a communication link 125 as described herein with reference to FIG. 1. In some aspects, the UE 115-a and the network entity 105-a may support SBFD communications, and as such, may transmit and receive at a same time but using different frequency resources (e.g., the UE 115-a may receive a downlink message via two or more downlink subbands 215 of an SBFD TTI).

The SBFD TTI may support two or more downlink subbands 215, including a downlink subband 215-a and a downlink subband 215-b separated by an uplink subband 220. Each downlink subband 215 may carry a corresponding DMRS 230 and a corresponding PDSCH 225 (e.g., data). For example, the downlink subband 215-a may include a DMRS 230-a followed by a PDSCH 225-a, and the downlink subband 215-b may include a DMRS 230-b followed by a PDSCH 225-b. In some aspects, the PDSCH 225-a and the PDSCH 225-b may be a two parts of a same PDSCH 225 split between the multiple downlink subbands 215. The SBFD TTI may be an example of an SBFD slot or other resource.

In some examples, the UE 115-a may receive a control message 210 indicating a wideband precoding configuration for wideband precoding of the two or more downlink subbands 215 for the SBFD communications. The wideband precoding configuration may indicate, to the UE 115-a, which two or more downlink subbands 215 are scheduled to carry a respective PDSCH 225 that is wideband precoded. The UE 115-a may use this information to monitor for and receive the PDSCHs 225, determine a processing time for processing the PDSCHs 225, and thus, determine when to transmit feedback in response to the PDSCHs 225.

The UE 115-a may receive at least one grant 235 scheduling a PDSCH 225-a via the downlink subband 215-a and the PDSCH 225-b via the downlink subband 215-b within the SBFD TTI. In accordance with the grant 235, the UE 115-a may receive downlink data 240 via the downlink subbands 215. That is, the network entity 105-a may schedule a PDSCH 225 via two or more downlink subbands 215 of the SBFD TTI (e.g., of a same slot), and the network entity 105-a may transmit the downlink data via the PDSCH 225 in the respective downlink subband 215. In some examples, the UE 115-a may monitor the DMRSs 230 for the respective PDSCH 225.

In some examples, the UE 115-a may process the PDSCH 225 according to a processing time (e.g., processing procedure time), which may be based in part on the wideband precoding configuration. The processing time, $T_{proc,1}$, may represent a time between a symbol in which the UE 115-a receives the PDSCH 225 and a symbol in which the UE 115-a transmits a feedback message 245 to the network entity 105-a acknowledging reception of the PDSCH 225. For example, the UE 115-a may transmit the feedback message 245 to the network entity 105-a via a feedback TTI (e.g., an uplink subband, via a physical uplink control channel (PUCCH)), where a time period between the SBFD TTI and the feedback TTI may be based on the wideband precoding configuration and the grant 235 scheduling the PDSCH 225 via the two or more downlink subbands 215 within the SBFD TTI. The feedback message 245 may include a HARQ ACK acknowledging that the UE 115-a processed the downlink data 240. In some aspects, the UE 115-a may determine the time period between the SBFD TTI and the feedback TTI based on the wideband precoding configuration. That is, as the wideband precoding configuration may indicate to the UE 115-a that the downlink data 240 is wideband precoded for each downlink subband 215, the UE 115-a may determine a corresponding (and sufficient) time period before transmitting the feedback TTI. Put another way, the UE 115-a may utilize the information in the wideband precoding configuration to determine when to transmit the feedback message 245. In this way, a scheduling offset K1 may indicate a feedback TTI (e.g., an uplink resource) in which the UE 115-a is to transmit the feedback message 245, where $T_{proc,1}$ may indicate a minimum bound (e.g., the first time period, a processing time) on K1.

For narrowband or half-duplex communications (in which the network entity 105-a may perform wideband precoding on a slot-basis), a first uplink symbol of a PUCCH, which carries the feedback message, may start no earlier than at a symbol $L_1$, where $L_1$ may be defined as a next uplink symbol with its cyclic prefix starting after $T_{proc,1}$ following the end of the last symbol of the PDSCH 225 carrying the downlink data (e.g., a transport block) being acknowledged by the UE 115-a. That is, the UE 115-a may transmit the feedback message via an uplink symbol of a PUCCH beginning after $T_{proc,1}$. The processing time may be represented by Equation 1.

$$T_{proc,1} = (N_1 + d_{1,1} + d_2)(2048 + 144) \cdot \kappa 2^{-\mu} \cdot T_c + T_{ext} \quad (1)$$

In Equation 1, $N_1$ may represent a value determined from a table based on a subcarrier spacing and processing capability (e.g., a regular processing capability 1 or an advanced or fast processing capability 2), $d_{1,1}$ may be a value that depends on the allocation of the PDSCH 225 (e.g., UE processing capability 1, PDSCH mapping type A or B, a PDSCH end symbol), $d_2$ may be a value that depends on a priority of the PUCCH and whether the PUCCH overlaps with another PUCCH or PUSCH. In addition, $K2^{-\mu}$ may represent a scaling factor based on a subcarrier spacing, and $T_C$ and $T_{ext}$ may represent time constants (e.g., time extensions).

In addition, based on particular PDSCH and DMRS configurations, the constant μ on which $T_{proc,1}$ depends may have one of two values. For example, if the UE 115-a supports a first PDSCH processing capability (e.g., PDSCH processing capability 1), the PDSCH processing time may depend on a location of a DMRS in a downlink TTI for the PDSCH 225. For example, as subcarrier spacing increases, the quantity of symbols in the processing time may increase as the lengths of the symbols may decrease. If the UE 115-*a* supports a second PDSCH processing capability (e.g., PDSCH processing capability 2), the PDSCH processing time may depend on a scheduled RB allocation for the PDSCH 225.

However, in the case of SBFD communication, and if wideband precoding is enabled (e.g., allowed) within each downlink subband 215 of the SBFD TTI, the UE 115-*a* may use a longer processing timeline to process the downlink data 240. That is, the UE 115-*a* may require more time to process the two downlink subbands 215 when wideband precoding is performed within each downlink subband 215 as compared to when precoding is performed on only a single downlink subband 215. In addition, the UE 115-*a* may process each downlink subband 215 sequentially (and the network entity 105-*a* may wideband precode each downlink subband 215 sequentially for transmission). As such, the processing flow of a wideband PDSCH may be different than that of a narrowband PDSCH, and thus, the UE 115-*a* may benefit from adjusting the PDSCH processing time based on the wideband precoding and the multiple downlink subbands 215. The adjusted PDSCH processing time is described herein with respect to FIG. 3.

In some implementations, to relax the processing timeline associated with the PDSCH 225 in the SBFD TTI if the network entity 105-*a* enabled wideband precoding and scheduled the PDSCH 225 via the two or more downlink subbands 215 (e.g., the downlink subband 215-*a* and the downlink subband 215-*b*), the UE 115-*a* may add or change terms in $T_{proc,1}$. For example, the UE 115-*a* may introduce an additional term, $d_3$, to $T_{proc,1}$, as shown in Equation 2, where the value of $d_3$ may be 0 unless the network entity 105-*a* schedules the PDSCH 225 via two or more downlink subbands 215 for a same SBFD TTI and enables wideband precoding within the individual downlink subbands 215.

$$T_{proc,1} = (N_1 + d_{1,1} + d_2 + d_3)(2048 + 144) \cdot \kappa 2^{-\mu} \cdot T_c + T_{ext} \quad (2)$$

According to Equation 2, the duration of the processing time $T_{proc,1}$ may be calculated using the non-zero value $d_3$ based on the wideband precoding configuration and the grant 235 scheduling the PDSCH 225 via the two or more downlink subbands 215. If the aforementioned conditions are satisfied, $d_3$ may have a non-zero value depending on one or more factors such as starting and ending symbols of the PDSCH 225 within the SBFD TTI in time, a length of the PDSCH 225 within the SBFD TTI in time, a location of additional DMRS symbols (carrying DMRSs 230) in the respective downlink subband 215, a size of the PDSCH 225 in each downlink subband 215, or any combination thereof. Similarly to $d_{1,1}$ and $d_2$ of Equation 1, $d_3$ may depend on a subcarrier spacing. In this way, $d_3$ may take one of multiple values based on such factors, which the UE 115-*a* may select based on the wideband precoding configuration and the PDSCH 225 being scheduled via the two or more downlink subbands 215. Then, the UE 115-*a* may use $d_3$ in Equation 1 to calculate the processing time $T_{proc,1}$ and transmit the feedback message 245 after the processing time.

Alternatively, or additionally, as shown in Equation 3, the UE 115-*a* may introduce an additive, constant time offset $T_{SBFD}$ to $T_{proc,1}$ to increase the processing time $T_{proc,1}$ and accommodate the wideband precoding configuration and multiple downlink subbands 215. In some examples, $T_{SBED}$ may be similar to the $T_{ext}$ term of Equation 1.

$$T_{proc,1} = (N_1 + d_{1,1} + d_2)(2048 + 144) \cdot \kappa 2^{-\mu} \cdot T_c + T_{ext} + T_{SBFD} \quad (3)$$

In some examples, the UE 115-*a* may report $T_{SBED}$ in the form of a capability. For example, the UE 115-*a* may transmit a capability message indicating a capability of the UE 115-*a* to support adding a time offset (e.g., $T_{SBFD}$) to determine a duration of the processing time (e.g., a first time period). That is, the capability may indicate that the UE 115-*a* supports processing the PDSCH 225 within a duration that is the first time period and the time offset. In such cases, the UE 115-*a* may transmit the capability message prior to receiving the control message 210 indicating wideband precoding configuration. Then, the network entity 105-*a* may configure the PDSCH 225 and the wideband precoding configuration based on the capability message (e.g., based on the capability of the UE 115-*a* to support the first time period and the time offset).

Alternatively, or additionally, $T_{SBFD}$ may be defined based on the PDSCH allocation in the downlink subbands 215. That is, the time offset $T_{SBFD}$ may be added to the processing time based on the wideband precoding configuration and the at least one grant 235 scheduling the PDSCH 225 via the two or more downlink subbands 215. In some cases, a larger PDSCH allocation in the downlink subbands 215 may result in a larger value for the time offset $T_{SBFD}$. In some aspects, $T_{SBED}$ may take a value independent of a subcarrier spacing.

In some implementations, the UE 115-*a* may support a PDSCH processing capability 1 or a PDSCH processing capability 2 (e.g., advanced processing). In some cases, if a higher-layer parameter processingType2Enabled in the information element PDSCH-ServingCellConfig is configured and set to "enable," the UE 115-*a* may lack support for the PDSCH processing capability 2 and may support the PDSCH processing capability 1. That is, the UE 115-*a* may receive an indication (e.g., via PDSCH-ServingCellConfig) that a second processing capability timeline (corresponding to the PDSCH processing capability 2) is enabled, where a first processing capability timeline (corresponding to the PDSCH processing capability 1) is applied for processing the PDSCH 225 received via the downlink subbands 215 based on the wideband precoding configuration and the at least one grant 235 scheduling the PDSCH 225 via the two or more downlink subbands 215. In some examples, enabling the second processing capability timeline may result in an error, in which case the UE 115-*a* may also fall back and use the first processing capability timeline.

Alternatively, or additionally, the UE 115-*a* may support the second processing capability timeline (and thus, the PDSCH processing capability 2) based on a quantity of RBs scheduled for the PDSCH 225. For example, for a PDSCH processing capability 2 with a scheduling limitation when $\mu=1$, if the scheduled RB allocation exceeds 136 RBs, the UE 115-*a* may default to using and supporting the first processing capability timeline. In some examples, the scheduled RB allocation may refer to a total quantity of scheduled RBs over the downlink subband 215-*a* and the downlink subband 215-*b* within the SBFD TTI. That is, the UE 115-*a* may apply the first processing capability timeline for processing the PDSCH 225 received via the two or more downlink subbands 215 based on a quantity of RBs within the two or more downlink subbands 215 of the SBFD TTI failing to satisfy a threshold (e.g., exceeding the threshold).

For example, based on the total quantity of RBs within the SBFD TTI, the UE 115-*a* may support the second processing capability timeline if the total quantity is less than 136 RBs.

Alternatively, or additionally, the scheduled RB allocation may refer to the scheduled RBs in the larger of the two or more downlink subbands 215 if the downlink subbands 215 have unequal sizes (e.g., include different quantities of symbols). That is, the scheduled RB allocation may refer to a quantity of RBs within the SBFD TTI that includes a first quantity of scheduled RBs within the downlink subband 215-*a* (e.g., a first downlink subband 215), where the first quantity is greater than a second quantity of scheduled RBs within the downlink subband 215-*b* (e.g., a second downlink subband 215). For example, if the downlink subband 215-*a* includes 50 RBs and the downlink subband 215-*b* includes 70 RBs, the larger of the downlink subbands 215 (the downlink subband 215-*b*) includes fewer than 136 RBs, thus the UE 115-*a* may support the second processing capability timeline.

In some aspects, the UE 115-*a* may include a term $K_{offset,\ SBFD}$ to $T_{proc,1}$ as shown in Equation 4 to adjust the first time period (e.g., the processing time). For example, the UE 115-*a* may include $K_{offset,\ SBFD}$ for cases in which the network entity 105-*a* schedules the PDSCH 225 via the two or more downlink subbands 215.

$$T_{proc,1} = (N_1 + d_{1,1})(2048 + 144) \cdot \kappa 2^{-\mu} \cdot T_c + T_{ext} + K_{offset,SBFD} \quad (4)$$

Using Equation 4, the UE 115-*a* may apply $K_{offset,\ SBFD}$ for cases in which wideband precoding is enabled within each downlink subband 215 or for all PDSCHs 225 scheduled in the SBFD TTI or other SBFD slots. That is, a time period between the SBFD TTI and the feedback TTI may include the first time period, $T_{proc,1}$, and the time offset $K_{offset,\ SBFD}$ based on the wideband precoding configuration and the grant 235 scheduling the PDSCH 225 via the two or more downlink subbands 215. In such cases, a value K1 may define a time between the transmission of the PDSCH 225 and transmission of the feedback message 245. Thus, K1 may be greater than $T_{proc,1}$ such that the UE 115-*a* has sufficient time to process the downlink data 240. Adding the offset $K_{offset,\ SBFD}$ to K1 may ensure that $K1+K_{offset,\ SBFD}>T_{proc,1}$. This may enable the UE 115-*a* to add the offset to provide enough processing time without changing the UE's processing requirement. In some examples, the wideband precoding configuration may indicate which one of equations (2)-(4) to apply for determining in which TTI to send feedback, one or more values for one or more parameters in equations (2)-(4) (e.g., a value for $d_3$, $T_{SBFD}$, $T_{SBFD}$, and so on), indicating which processing capability timeline (e.g., processing capability 1 or 2) for receiving PDSCH transmissions, or any combination thereof.

Figure 3:
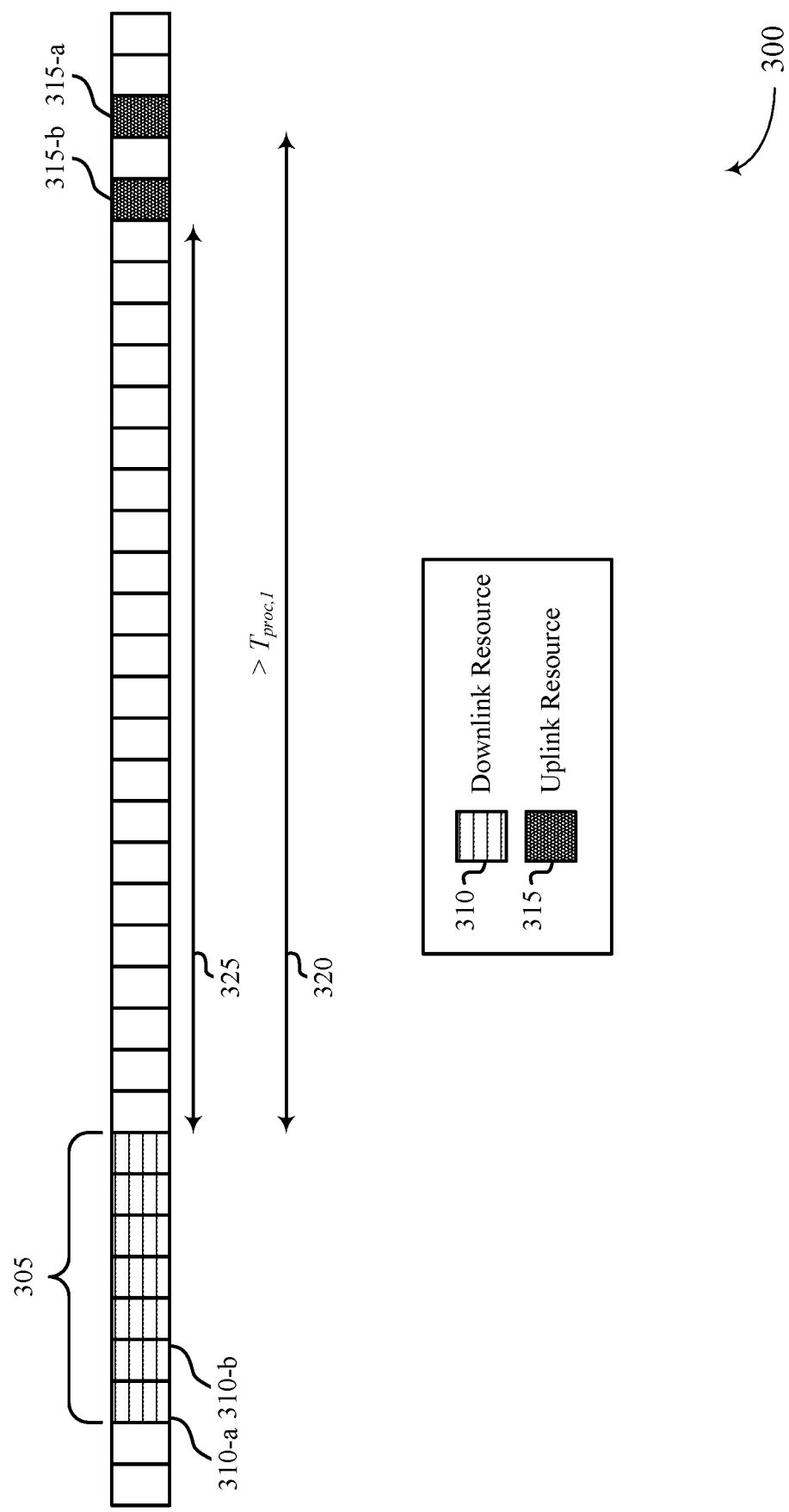
FIG. 3 shows an example of a processing timeline that supports configuring a processing time for wideband precoding in SBFD in accordance with one or more aspects of the present disclosure.

FIG. 3 shows an example of a processing timeline 300 that supports configuring a processing time for wideband precoding in SBFD in accordance with one or more aspects of the present disclosure. In some examples, the processing timeline 300 may implement aspects of the wireless communications systems 100 and 200 or may be implemented by aspects of the wireless communications systems 100 and 200. For example, a UE 115 may support the processing timeline 300 when wideband precoding is enabled per subband of an SBFD TTI and when a network entity 105 schedules a PDSCH via two or more downlink resources 310.

In some examples, the network entity 105 may schedule and transmit a PDSCH via an SBFD TTI 305, which may include two or more downlink resources 310. The downlink resources 310 may be downlink subbands or other types of resource. For example, the SBFD TTI 305 may include a downlink resource 310-*a*, a downlink resource 310-*b*, and so on. The UE 115 may receive the PDSCH and process the PDSCH during a processing time $T_{proc,1}$, which may be based in part on a wideband precoding configuration that indicates wideband precoding is enabled for each downlink resource 310. For example, the UE 115 may determine $T_{proc,1}$ based on the knowledge that the UE 115 is to process a PDSCH transmitted via numerous downlink resources 310.

After a time period 320 (e.g., a duration of time) that is greater than $T_{proc,1}$, the UE 115-*a* may transmit a feedback message (e.g., a HARQ-ACK) via an uplink resource 315-*a* (e.g., a feedback TTI). The uplink resource 315-*a* may be included in a PUCCH, and may be an uplink subband or another type of resource. As described herein with reference to FIG. 2, the UE 115 may adjust the time period 320 (e.g., the duration of time greater than $T_{proc,1}$) to account for a wideband precoding configuration and the PDSCH being scheduled via the two or more downlink resources 310 within the SBFD TTI 305. For example, the time period 320 may be calculated based on additional terms or time offsets to ensure that the UE 115 has sufficient time to process the downlink data that is wideband precoded per downlink resource 310. In some examples, the UE 115 may use the time period 320 to transmit the feedback message via the uplink resource 315-*a* based on operating according to a processing capability 2 (e.g., a second processing capability timeline).

Alternatively, or additionally, the UE 115 may apply a first processing capability timeline (e.g., support a processing capability 1) for processing the PDSCHs received via only one of the two or more downlink resources 310 within the same SBFD TTI 305. For example, if the network entity 105 schedules transmission of the PDSCH via the downlink resource 310-*a* (without scheduling the downlink resource 310-*a*), the UE 115 may transmit the feedback message via an uplink resource 315-*b* that is sooner than the uplink resource 315-*a* according to a time period 325. As such, if the PDSCH is scheduled via a single downlink resource 310, the UE 115 may use a shorter processing time, which may result in the time period 325 (shorter than the time period 320) between reception of the downlink resource 310-*a* and transmission of the uplink resource 315-*b*.

Figure 4:
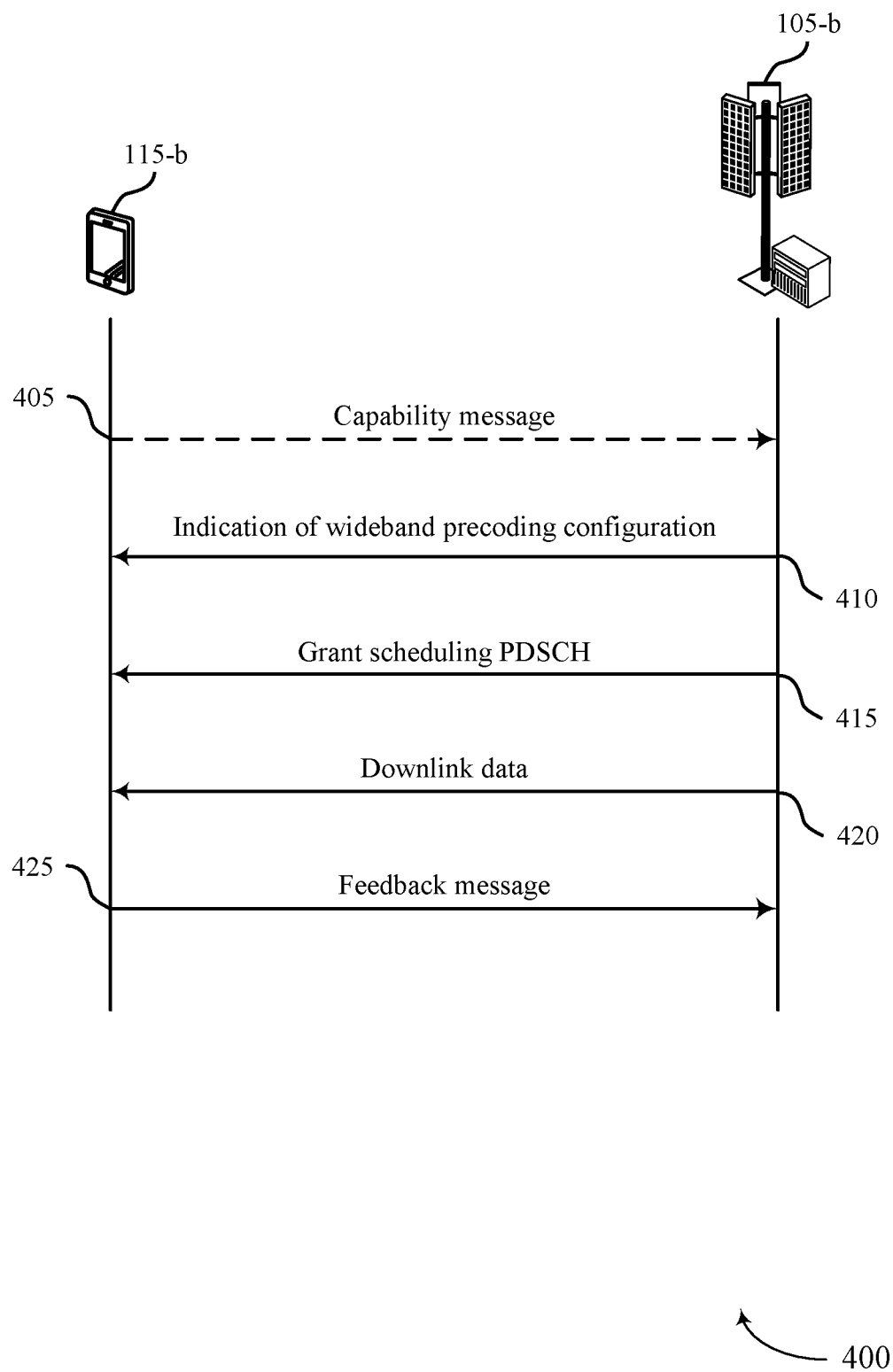
FIG. 4 shows an example of a process flow that supports configuring a processing time for wideband precoding in SBFD in accordance with one or more aspects of the present disclosure.

FIG. 4 shows an example of a process flow 400 that supports configuring a processing time for wideband precoding in SBFD in accordance with one or more aspects of the present disclosure. The process flow 400 may implement aspects of wireless communications systems 100 and 200, or may be implemented by aspects of the wireless communications system 100 and 200. For example, the process flow 400 may illustrate operations between a UE 115-*b* and a network entity 105-*b*, which may be examples of corresponding devices described herein. In the following description of the process flow 400, the operations between the UE 115-*b* and the network entity 105-*b* may be transmitted in a different order than the example order shown, or the operations performed by the UE 115-*b* and the network entity 105-*b* may be performed in different orders or at different times. Some operations may also be omitted from the process flow 400, and other operations may be added to the process flow 400.

At 405, the UE 115-*b* may transmit, to the network entity 105-*b*, a capability message indicating a capability of the UE 115-*b* to support adding a time offset to a time period for determining a duration of a first time period between an SBFD TTI and a feedback TTI. For example, the time offset may include an additional time offset based on a wideband precoding configuration and at least one grant scheduling a PDSCH via two or more downlink subbands within the SBFD TTI. That is, the capability message may indicate that the UE 115-*b* is capable of processing the PDSCH during a duration of the time period plus the time offset.

At 410, the UE 115-*b* may receive, from the network entity 105-*b*, a control message indicating the wideband precoding configuration for wideband precoding of the two or more downlink subbands for SBFD communication. The wideband precoding configuration may indicate that the PDSCH is to be wideband precoded per downlink subband of an SBFD TTI (e.g., an SBFD slot) in which the PDSCH is scheduled.

At 415, the UE 115-*b* may receive, from the network entity 105-*b*, at least one grant scheduling a PDSCH via the two or more downlink subbands within the SBFD TTI. That is, the PDSCH may be wideband precoded in each of the two or more downlink subbands.

At 420, the UE 115-*b* may receive, from the network entity 105-*b* and in accordance with the at least one grant, downlink data via the two or more downlink subbands of the PDSCH. The UE 115-*b* may receive the SBFD TTI including the two or more downlink subbands which may carry a respective DMRS in addition to the respective downlink data.

At 425, the UE 115-*b* may transmit, to the network entity 105-*b* via a feedback TTI, a feedback message for the downlink data, wherein the first time period between the SBFD TTI and the feedback TTI is on the wideband precoding configuration and the at least one grant (e.g., the at least one grant scheduling the PDSCH via the two or more downlink subbands within the SBFD TTI). The feedback message may include a HARQ-ACK acknowledging that the UE 115-*b* received and processed the downlink data. In addition, the feedback TTI may be an uplink subband of an SBFD TTI. Based on the capability, the UE 115-*b* may add the time offset to ensure the UE 115-*b* has sufficient time to process the downlink data in each of the two or more downlink subbands.

Figure 5:
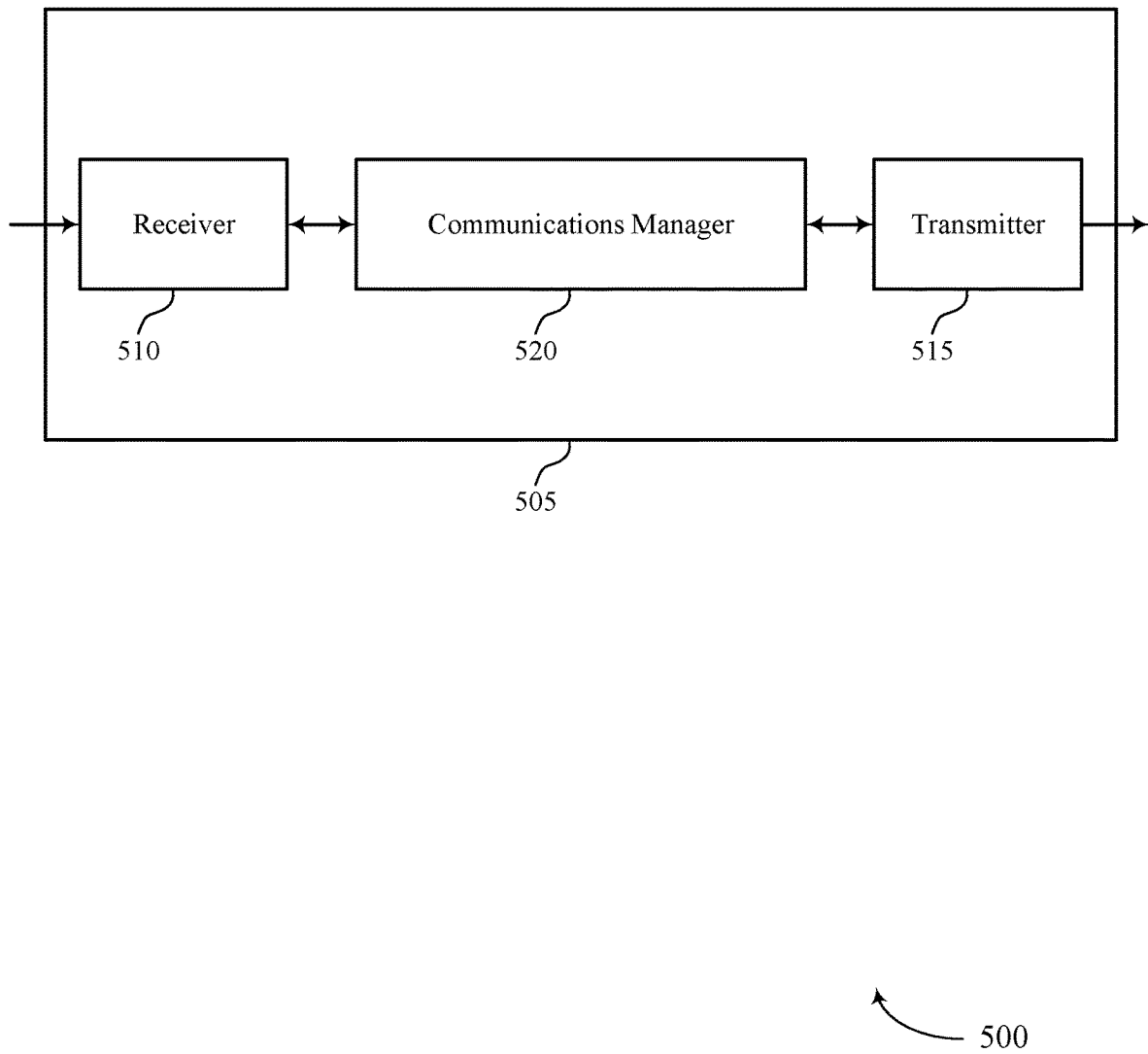
FIGS. 5 and 6 show block diagrams of devices that support configuring a processing time for wideband precoding in SBFD in accordance with one or more aspects of the present disclosure.

FIG. 5 shows a block diagram 500 of a device 505 that supports configuring a processing time for wideband precoding in SBFD in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to configuring a processing time for wideband precoding in SBFD). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to configuring a processing time for wideband precoding in SBFD). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of configuring a processing time for wideband precoding in SBFD as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in hardware, software (e.g., executed by at least one processor), or any combination thereof. If implemented in code executed by at least one processor, the functions of the communications manager 520, the receiver 510, the transmitter 515, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for receiving a control message indicating a wideband precoding configuration for wideband precoding of two or more downlink subbands for SBFD communication. The communications manager 520 is capable of, configured to, or operable to support a means for receiving at least one grant scheduling a downlink shared channel via the two or more downlink subbands within a SBFD TTI. The communications manager 520 is capable of, configured to, or operable to support a means for receiving, in accordance with the at least one grant, downlink data via the two or more downlink subbands of the downlink shared channel. The communications manager 520 is capable of, configured to, or operable to support a means for transmitting, via a feedback TTI, a feedback message for the downlink data, where a first time period between the SBFD TTI and the feedback TTI is based on the wideband precoding configuration and the at least one grant.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for adjusting a processing time for wideband precoding in SBFD, which may reduce processing, reduce power consumption, improve signaling throughput, improve decoding success rates, and improve communications between a UE and a network entity.

Figure 6:
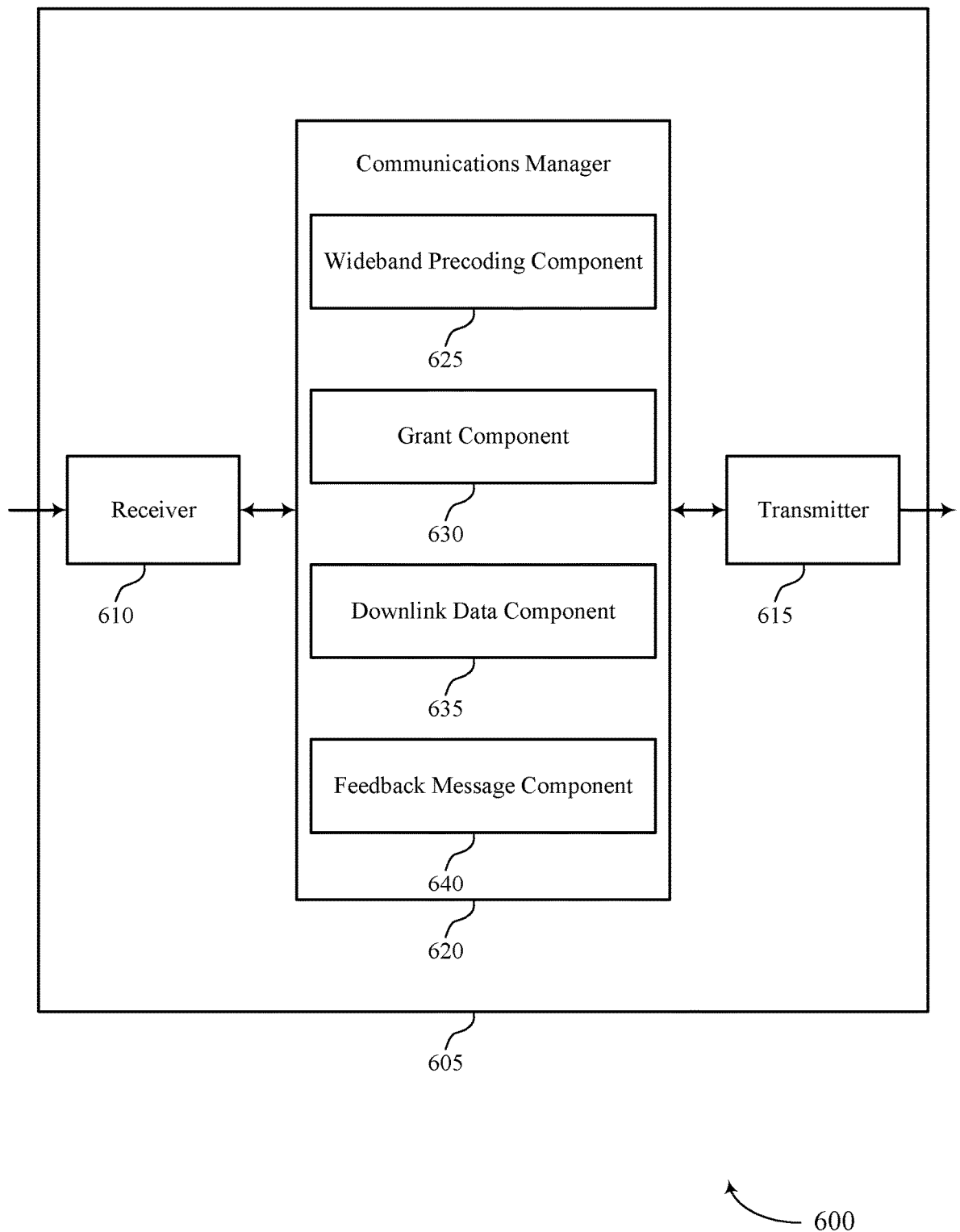

FIG. 6 shows a block diagram 600 of a device 605 that supports configuring a processing time for wideband precoding in SBFD in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to configuring a processing time for wideband precoding in SBFD). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to configuring a processing time for wideband precoding in SBFD). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of configuring a processing time for wideband precoding in SBFD as described herein. For example, the communications manager 620 may include a wideband precoding component 625, a grant component 630, a downlink data component 635, a feedback message component 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The wideband precoding component 625 is capable of, configured to, or operable to support a means for receiving a control message indicating a wideband precoding configuration for wideband precoding of two or more downlink subbands for SBFD communication. The grant component 630 is capable of, configured to, or operable to support a means for receiving at least one grant scheduling a downlink shared channel via the two or more downlink subbands within a SBFD TTI. The downlink data component 635 is capable of, configured to, or operable to support a means for receiving, in accordance with the at least one grant, downlink data via the two or more downlink subbands of the downlink shared channel. The feedback message component 640 is capable of, configured to, or operable to support a means for transmitting, via a feedback TTI, a feedback message for the downlink data, where a first time period between the SBFD TTI and the feedback TTI is based on the wideband precoding configuration and the at least one grant.

Figure 7:
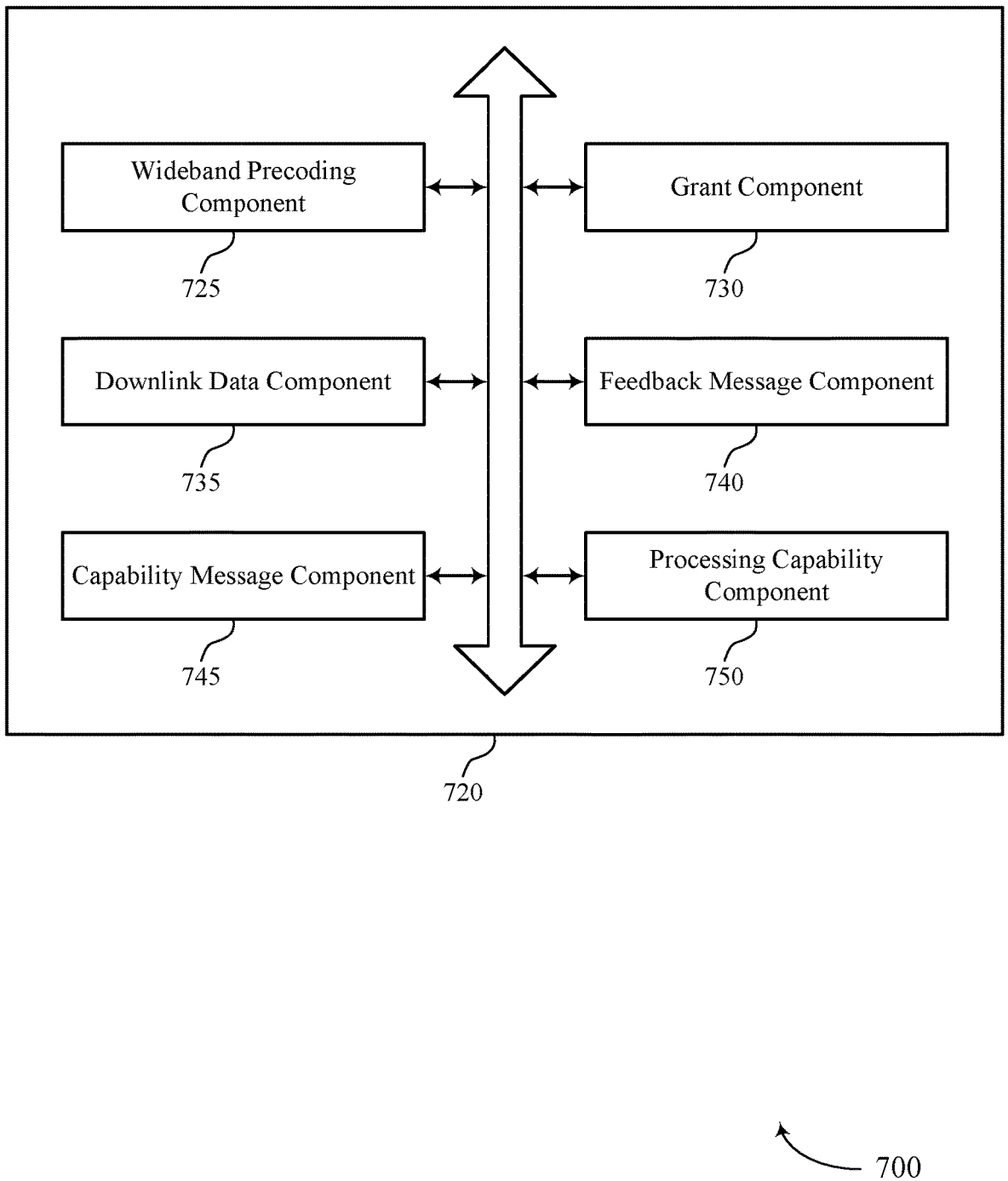
FIG. 7 shows a block diagram of a communications manager that supports configuring a processing time for wideband precoding in SBFD in accordance with one or more aspects of the present disclosure.

FIG. 7 shows a block diagram 700 of a communications manager 720 that supports configuring a processing time for wideband precoding in SBFD in accordance with one or more aspects of the present disclosure. The communications manager 720 may be an example of aspects of a communications manager 520, a communications manager 620, or both, as described herein. The communications manager 720, or various components thereof, may be an example of means for performing various aspects of configuring a processing time for wideband precoding in SBFD as described herein. For example, the communications manager 720 may include a wideband precoding component 725, a grant component 730, a downlink data component 735, a feedback message component 740, a capability message component 745, a processing capability component 750, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The wideband precoding component 725 is capable of, configured to, or operable to support a means for receiving a control message indicating a wideband precoding configuration for wideband precoding of two or more downlink subbands for SBFD communication. The grant component 730 is capable of, configured to, or operable to support a means for receiving at least one grant scheduling a downlink shared channel via the two or more downlink subbands within a SBFD TTI. The downlink data component 735 is capable of, configured to, or operable to support a means for receiving, in accordance with the at least one grant, downlink data via the two or more downlink subbands of the downlink shared channel. The feedback message component 740 is capable of, configured to, or operable to support a means for transmitting, via a feedback TTI, a feedback message for the downlink data, where a first time period between the SBFD TTI and the feedback TTI is based on the wideband precoding configuration and the at least one grant.

In some examples, a duration of the first time period is calculated using a first non-zero value based on the wideband precoding configuration and the at least one grant.

In some examples, the first non-zero value is based on a start symbol and an end symbol of the downlink shared channel within the SBFD TTI, a length of the downlink shared channel within the SBFD TTI in time, a location of one or more demodulation reference symbols within the SBFD TTI, a size of the downlink shared channel in each downlink subband of the two or more downlink subbands, or any combination thereof.

In some examples, the capability message component 745 is capable of, configured to, or operable to support a means for transmitting a capability message indicating a capability of the UE to support adding a time offset to a second time period for determining a duration of the first time period.

In some examples, a time offset is added to the first time period for determining a duration of the first time period based on the wideband precoding configuration and the at least one grant.

In some examples, to support receiving the control message, the processing capability component 750 is capable of, configured to, or operable to support a means for receiving an indication that a second processing capability timeline is enabled, where a first processing capability timeline is applied for processing the downlink shared channel received via the two or more downlink subbands based on the wideband precoding configuration and the at least one grant.

In some examples, a first processing capability timeline is applied for processing the downlink shared channel received via the two or more downlink subbands based on a quantity of RBs within the SBFD TTI failing to satisfy a threshold.

In some examples, the quantity of RBs within the SBFD TTI includes a total quantity of scheduled RBs within the two or more downlink subbands.

In some examples, the quantity of RBs within the SBFD TTI includes a first quantity of scheduled RBs within a first downlink subband of the two or more downlink subbands. In some examples, the first quantity is greater than a second quantity of scheduled RBs within a second downlink subband of the two or more downlink subbands.

In some examples, a second time period between the SBFD TTI and the feedback TTI includes the first time period and a time offset based on the wideband precoding configuration and the at least one grant.

In some examples, a second time period between the SBFD TTI and the feedback TTI includes the first time period and a time offset for a set of multiple downlink shared channels within the SBFD TTI.

Figure 8:
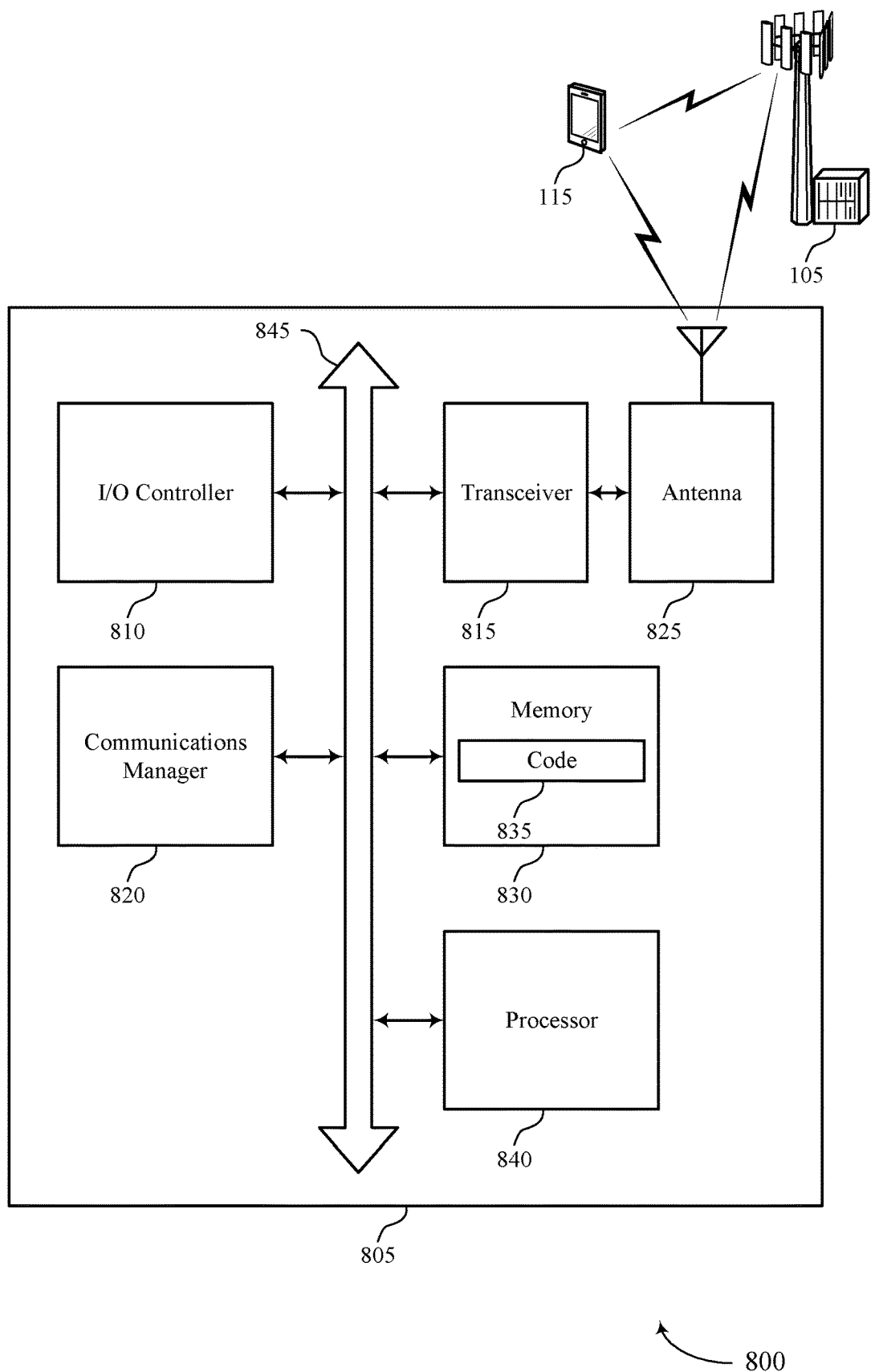
FIG. 8 shows a diagram of a system including a device that supports configuring a processing time for wideband precoding in SBFD in accordance with one or more aspects of the present disclosure.

FIG. 8 shows a diagram of a system 800 including a device 805 that supports configuring a processing time for wideband precoding in SBFD in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting configuring a processing time for wideband precoding in SBFD). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. As such, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code stored in the at least one memory 830 or otherwise, to perform one or more of the functions described herein.

The communications manager 820 may support wireless communications in accordance with examples as disclosed herein. For example, the communications manager 820 is capable of, configured to, or operable to support a means for receiving a control message indicating a wideband precoding configuration for wideband precoding of two or more downlink subbands for SBFD communication. The communications manager 820 is capable of, configured to, or operable to support a means for receiving at least one grant scheduling a downlink shared channel via the two or more downlink subbands within a SBFD TTI. The communications manager 820 is capable of, configured to, or operable to support a means for receiving, in accordance with the at least one grant, downlink data via the two or more downlink subbands of the downlink shared channel. The communications manager 820 is capable of, configured to, or operable to support a means for transmitting, via a feedback TTI, a feedback message for the downlink data, where a first time period between the SBFD TTI and the feedback TTI is based on the wideband precoding configuration and the at least one grant.

By including or configuring the communications manager 820 in accordance with examples as described herein, the device 805 may support techniques for adjusting a processing time for wideband precoding in SBFD, which may reduce processing, reduce power consumption, improve signaling throughput, improve decoding success rates, and improve communications between a UE and a network entity.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of configuring a processing time for wideband precoding in SBFD as described herein, or the at least one processor 840 and the at least one memory 830 may be otherwise configured to, individually or collectively, perform or support such operations.

Figure 9:
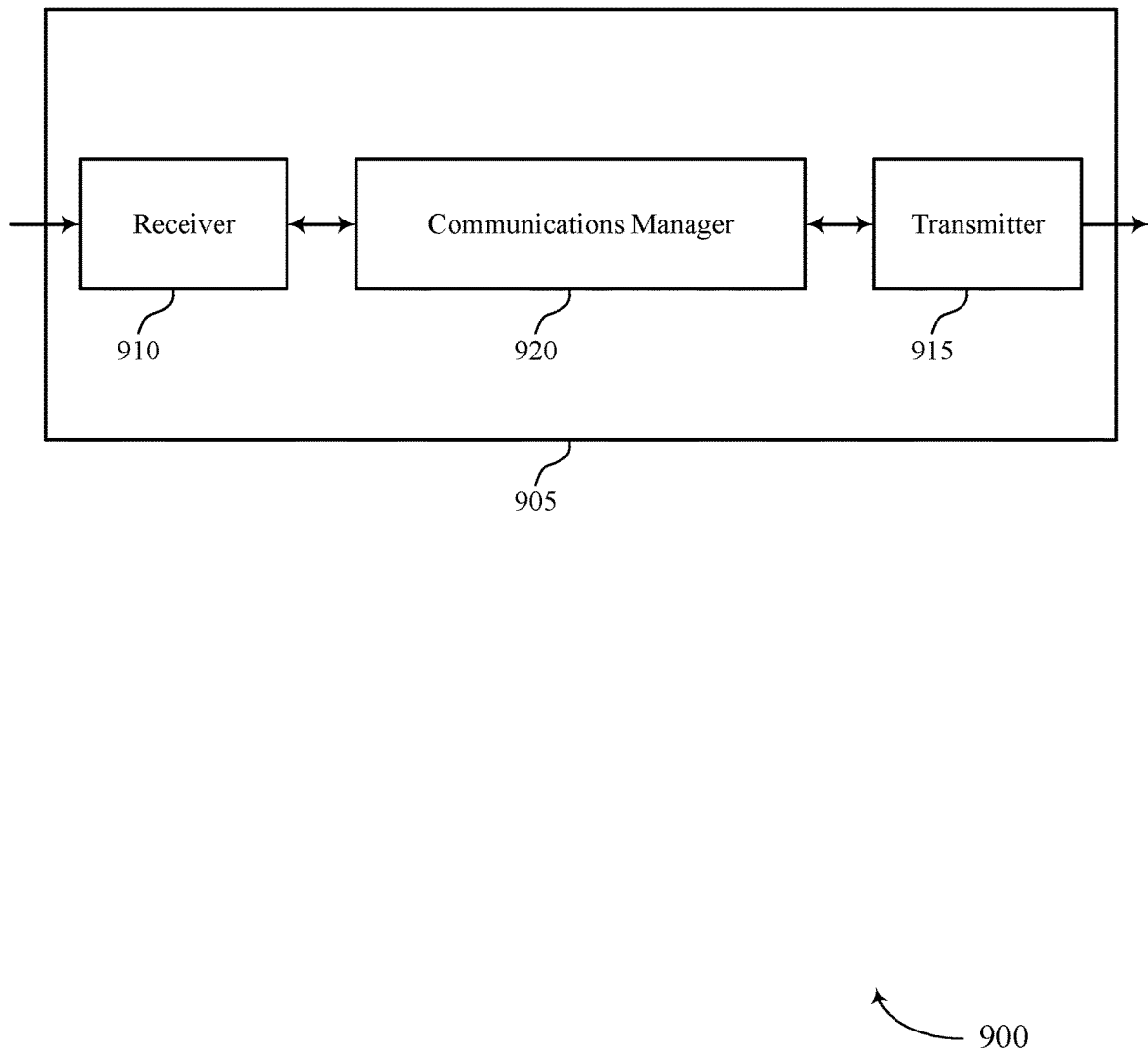
FIGS. 9 and 10 show block diagrams of devices that support configuring a processing time for wideband precoding in SBFD in accordance with one or more aspects of the present disclosure.

FIG. 9 shows a block diagram 900 of a device 905 that supports configuring a processing time for wideband precoding in SBFD in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of configuring a processing time for wideband precoding in SBFD as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, a GPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in hardware, software (e.g., executed by at least one processor), or any combination thereof. If implemented in code executed by at least one processor, the functions of the communications manager 920, the receiver 910, the transmitter 915, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for transmitting a control message indicating a wideband precoding configuration for wideband precoding of two or more downlink subbands for SBFD communication. The communications manager 920 is capable of, configured to, or operable to support a means for transmitting at least one grant scheduling a downlink shared channel via the two or more downlink subbands within a SBFD TTI. The communications manager 920 is capable of, configured to, or operable to support a means for transmitting, in accordance with the at least one grant, downlink data via the two or more downlink subbands of the downlink shared channel. The communications manager 920 is capable of, configured to, or operable to support a means for receiving, via a feedback TTI, a feedback message for the downlink data, where a first time period between the SBFD TTI and the feedback TTI is based on the wideband precoding configuration and the at least one grant.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for adjusting a processing time for wideband precoding in SBFD, which may reduce processing, reduce power consumption, improve signaling throughput, improve decoding success rates, and improve communications between a UE and a network entity.

Figure 10:
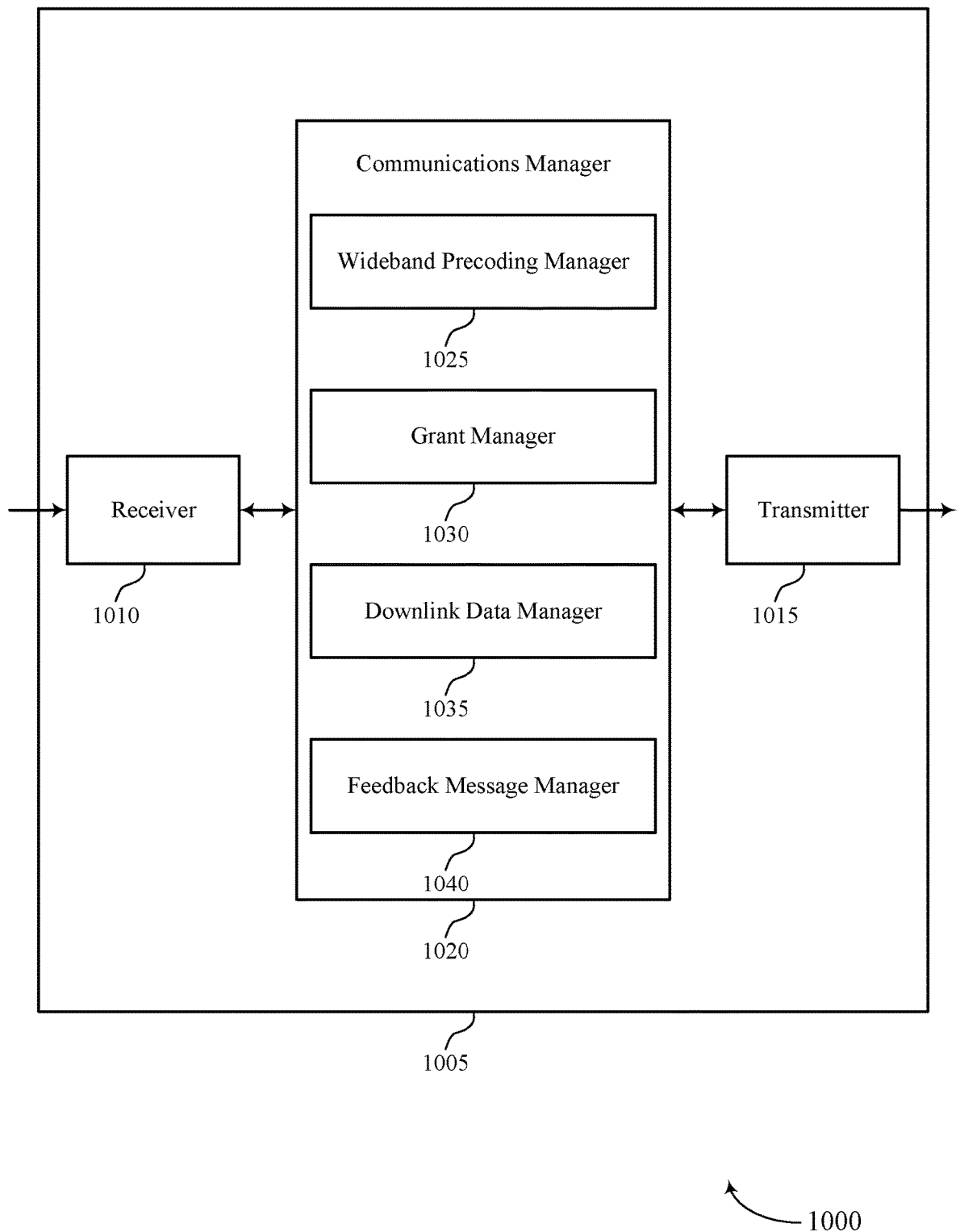

FIG. 10 shows a block diagram 1000 of a device 1005 that supports configuring a processing time for wideband precoding in SBFD in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of configuring a processing time for wideband precoding in SBFD as described herein. For example, the communications manager 1020 may include a wideband precoding manager 1025, a grant manager 1030, a downlink data manager 1035, a feedback message manager 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The wideband precoding manager 1025 is capable of, configured to, or operable to support a means for transmitting a control message indicating a wideband precoding configuration for wideband precoding of two or more downlink subbands for SBFD communication. The grant manager 1030 is capable of, configured to, or operable to support a means for transmitting at least one grant scheduling a downlink shared channel via the two or more downlink subbands within a SBFD TTI. The downlink data manager 1035 is capable of, configured to, or operable to support a means for transmitting, in accordance with the at least one grant, downlink data via the two or more downlink subbands of the downlink shared channel. The feedback message manager 1040 is capable of, configured to, or operable to support a means for receiving, via a feedback TTI, a feedback message for the downlink data, where a first time period between the SBFD TTI and the feedback TTI is based on the wideband precoding configuration and the at least one grant.

Figure 11:
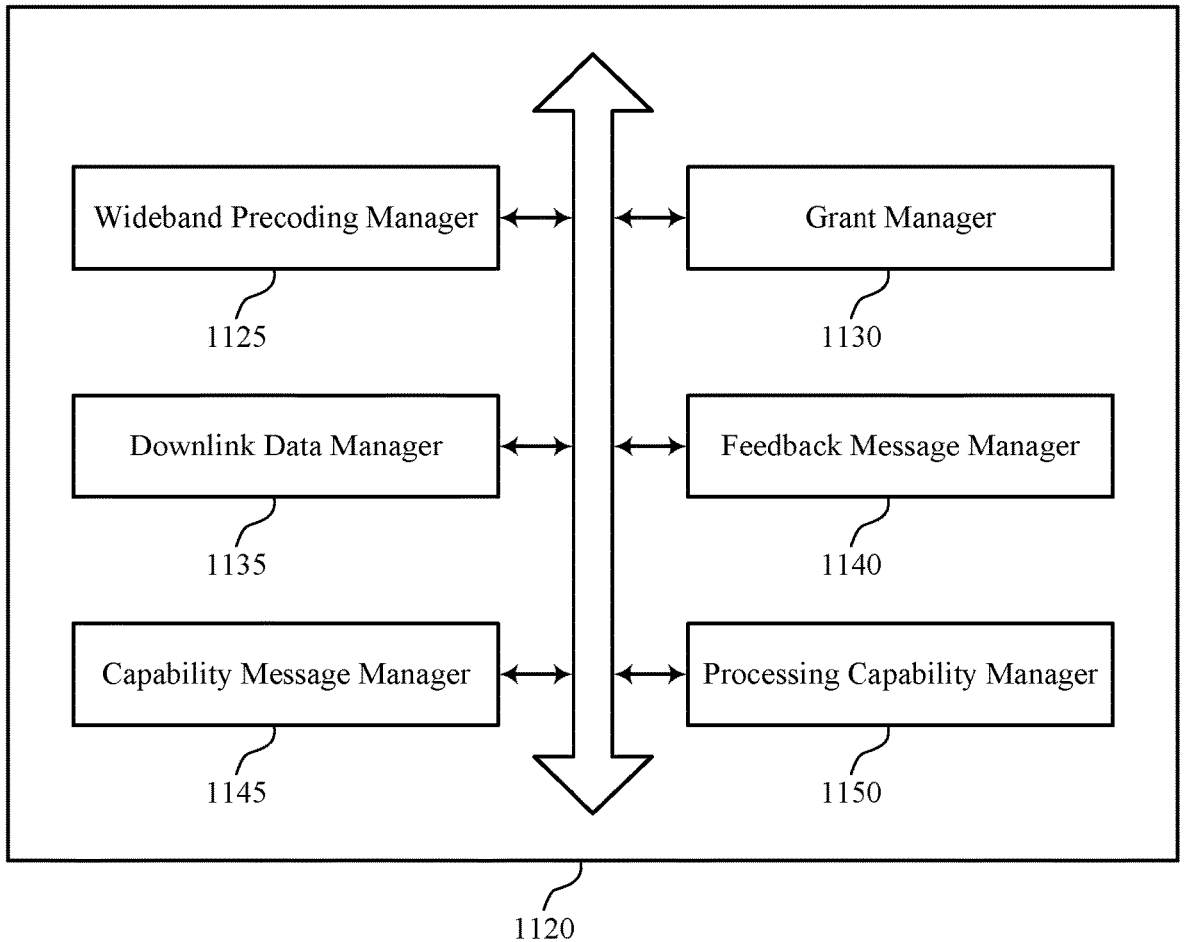
FIG. 11 shows a block diagram of a communications manager that supports configuring a processing time for wideband precoding in SBFD in accordance with one or more aspects of the present disclosure.

FIG. 11 shows a block diagram 1100 of a communications manager 1120 that supports configuring a processing time for wideband precoding in SBFD in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of configuring a processing time for wideband precoding in SBFD as described herein. For example, the communications manager 1120 may include a wideband precoding manager 1125, a grant manager 1130, a downlink data manager 1135, a feedback message manager 1140, a capability message manager 1145, a processing capability manager 1150, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The wideband precoding manager 1125 is capable of, configured to, or operable to support a means for transmitting a control message indicating a wideband precoding configuration for wideband precoding of two or more downlink subbands for SBFD communication. The grant manager 1130 is capable of, configured to, or operable to support a means for transmitting at least one grant scheduling a downlink shared channel via the two or more downlink subbands within a SBFD TTI. The downlink data manager 1135 is capable of, configured to, or operable to support a means for transmitting, in accordance with the at least one grant, downlink data via the two or more downlink subbands of the downlink shared channel. The feedback message manager 1140 is capable of, configured to, or operable to support a means for receiving, via a feedback TTI, a feedback message for the downlink data, where a first time period between the SBFD TTI and the feedback TTI is based on the wideband precoding configuration and the at least one grant.

In some examples, a duration of the first time period is calculated using a first non-zero value based on the wideband precoding configuration and the at least one grant.

In some examples, the first non-zero value is based on a start symbol and an end symbol of the downlink shared channel within the SBFD TTI, a length of the downlink shared channel within the SBFD TTI in time, a location of one or more demodulation reference symbols within the SBFD TTI, a size of the downlink shared channel in each downlink subband of the two or more downlink subbands, or any combination thereof.

In some examples, the capability message manager 1145 is capable of, configured to, or operable to support a means for receiving a capability message indicating a capability of a UE to support adding a time offset to a second time period for determining a duration of the first time period.

In some examples, a time offset is added to the first time period for determining a duration of the first time period based on the wideband precoding configuration and the at least one grant.

In some examples, to support transmitting the control message, the processing capability manager 1150 is capable of, configured to, or operable to support a means for transmitting an indication that a second processing capability timeline is enabled, where a first processing capability timeline is applied for processing the downlink shared channel received via the two or more downlink subbands based on the wideband precoding configuration and the at least one grant.

In some examples, a first processing capability timeline is applied for processing the downlink shared channel received via the two or more downlink subbands based on a quantity of RBs within the SBFD TTI failing to satisfy a threshold. In some examples, the quantity of RBs within the SBFD TTI includes a total quantity of scheduled RBs within the two or more downlink subbands.

In some examples, the quantity of RBs within the SBFD TTI includes a first quantity of scheduled RBs within a first downlink subband of the two or more downlink subbands. In some examples, the first quantity is greater than a second quantity of scheduled RBs within a second downlink subband of the two or more downlink subbands.

In some examples, a second time period between the SBFD TTI and the feedback TTI includes the first time period and a time offset based on the wideband precoding configuration and the at least one grant.

In some examples, a second time period between the SBFD TTI and the feedback TTI includes the first time period and a time offset for a set of multiple downlink shared channels within the SBFD TTI.

Figure 12:
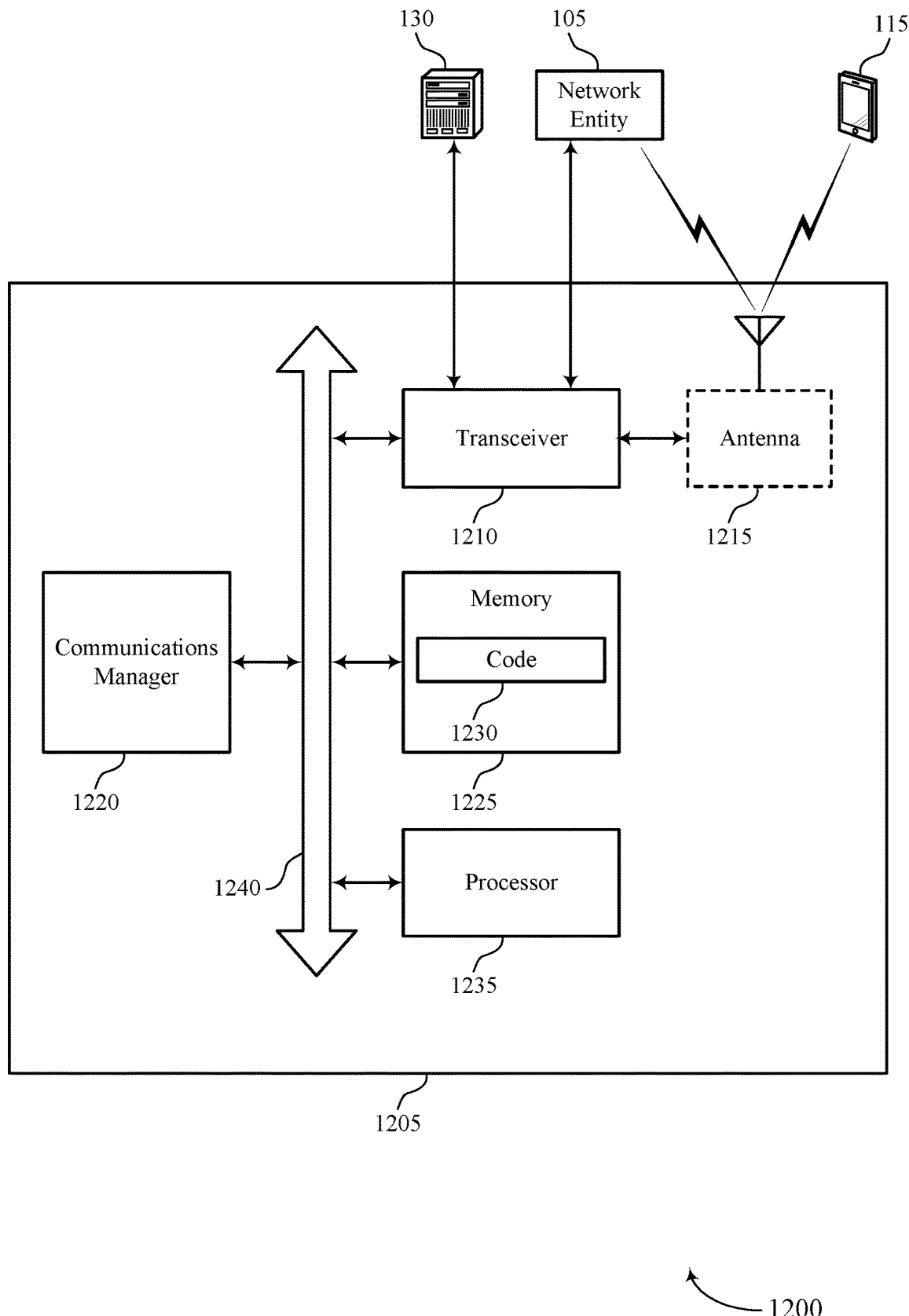
FIG. 12 shows a diagram of a system including a device that supports configuring a processing time for wideband precoding in SBFD in accordance with one or more aspects of the present disclosure.

FIG. 12 shows a diagram of a system 1200 including a device 1205 that supports configuring a processing time for wideband precoding in SBFD in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, a GPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting configuring a processing time for wideband precoding in SBFD). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. As such, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for transmitting a control message indicating a wideband precoding configuration for wideband precoding of two or more downlink subbands for SBFD communication. The communications manager 1220 is capable of, configured to, or operable to support a means for transmitting at least one grant scheduling a downlink shared channel via the two or more downlink subbands within a SBFD TTI. The communications manager 1220 is capable of, configured to, or operable to support a means for transmitting, in accordance with the at least one grant, downlink data via the two or more downlink subbands of the downlink shared channel. The communications manager 1220 is capable of, configured to, or operable to support a means for receiving, via a feedback TTI, a feedback message for the downlink data, where a first time period between the SBFD TTI and the feedback TTI is based on the wideband precoding configuration and the at least one grant.

By including or configuring the communications manager 1220 in accordance with examples as described herein, the device 1205 may support techniques for adjusting a processing time for wideband precoding in SBFD, which may reduce processing, reduce power consumption, improve signaling throughput, improve decoding success rates, and improve communications between a UE and a network entity.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of configuring a processing time for wideband precoding in SBFD as described herein, or the at least one processor 1235 and the at least one memory 1225 may be otherwise configured to, individually or collectively, perform or support such operations.

Figure 13:
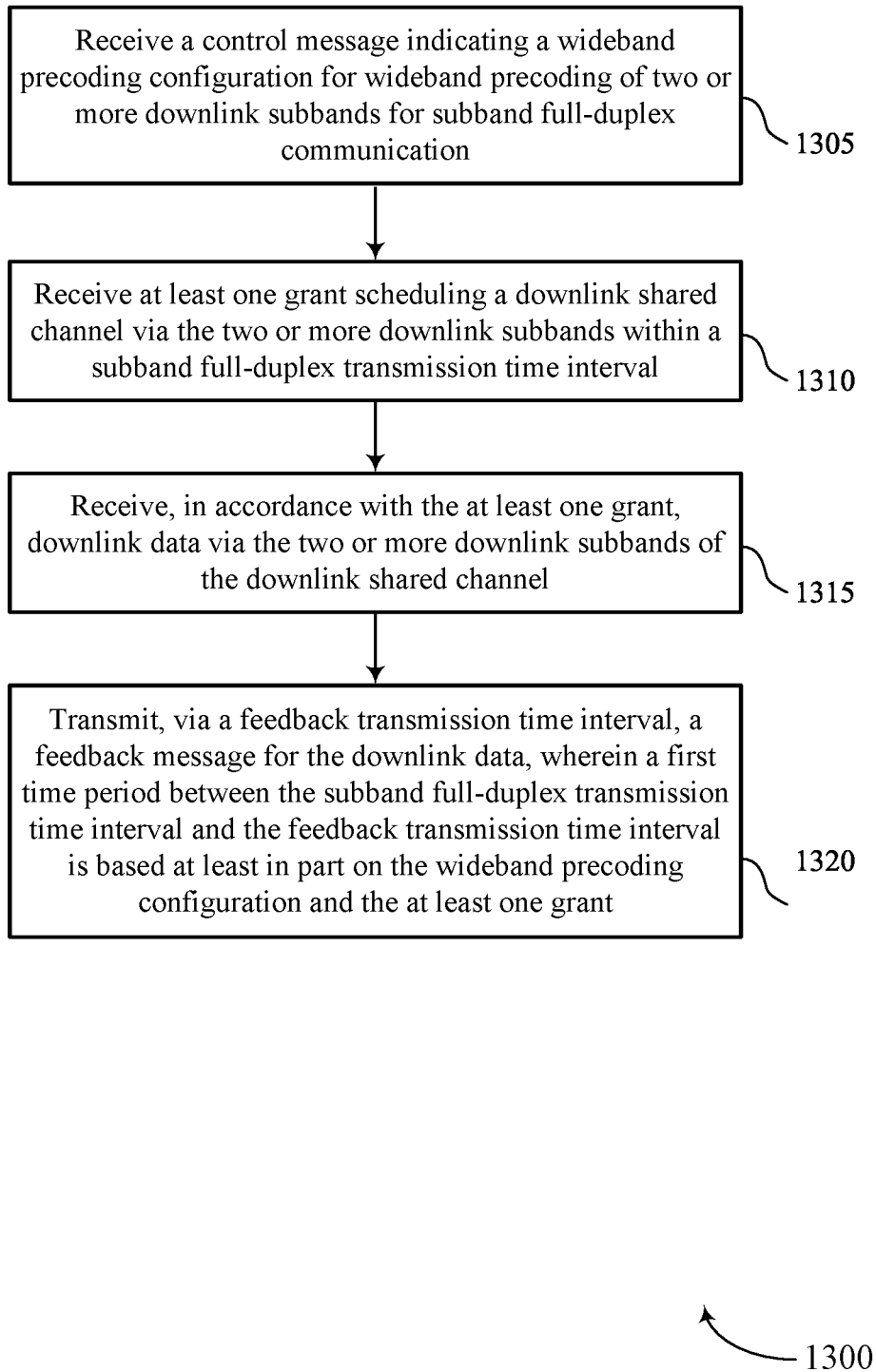
FIGS. 13 through 16 show flowcharts illustrating methods that support configuring a processing time for wideband precoding in SBFD in accordance with one or more aspects of the present disclosure.

FIG. 13 shows a flowchart illustrating a method 1300 that supports configuring a processing time for wideband precoding in SBFD in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving a control message indicating a wideband precoding configuration for wideband precoding of two or more downlink subbands for SBFD communication. The operations of 1305 may be performed in accordance with examples as disclosed herein. In some examples, aspects of the operations of 1305 may be performed by a wideband precoding component 725 as described with reference to FIG. 7.

At 1310, the method may include receiving at least one grant scheduling a downlink shared channel via the two or more downlink subbands within a SBFD TTI. The operations of 1310 may be performed in accordance with examples as disclosed herein. In some examples, aspects of the operations of 1310 may be performed by a grant component 730 as described with reference to FIG. 7.

At 1315, the method may include receiving, in accordance with the at least one grant, downlink data via the two or more downlink subbands of the downlink shared channel. The operations of 1315 may be performed in accordance with examples as disclosed herein. In some examples, aspects of the operations of 1315 may be performed by a downlink data component 735 as described with reference to FIG. 7.

At 1320, the method may include transmitting, via a feedback TTI, a feedback message for the downlink data, wherein a first time period between the SBFD TTI and the feedback TTI is based at least in part on the wideband precoding configuration and the at least one grant. The operations of 1320 may be performed in accordance with examples as disclosed herein. In some examples, aspects of the operations of 1320 may be performed by a feedback message component 740 as described with reference to FIG. 7.

Figure 14:
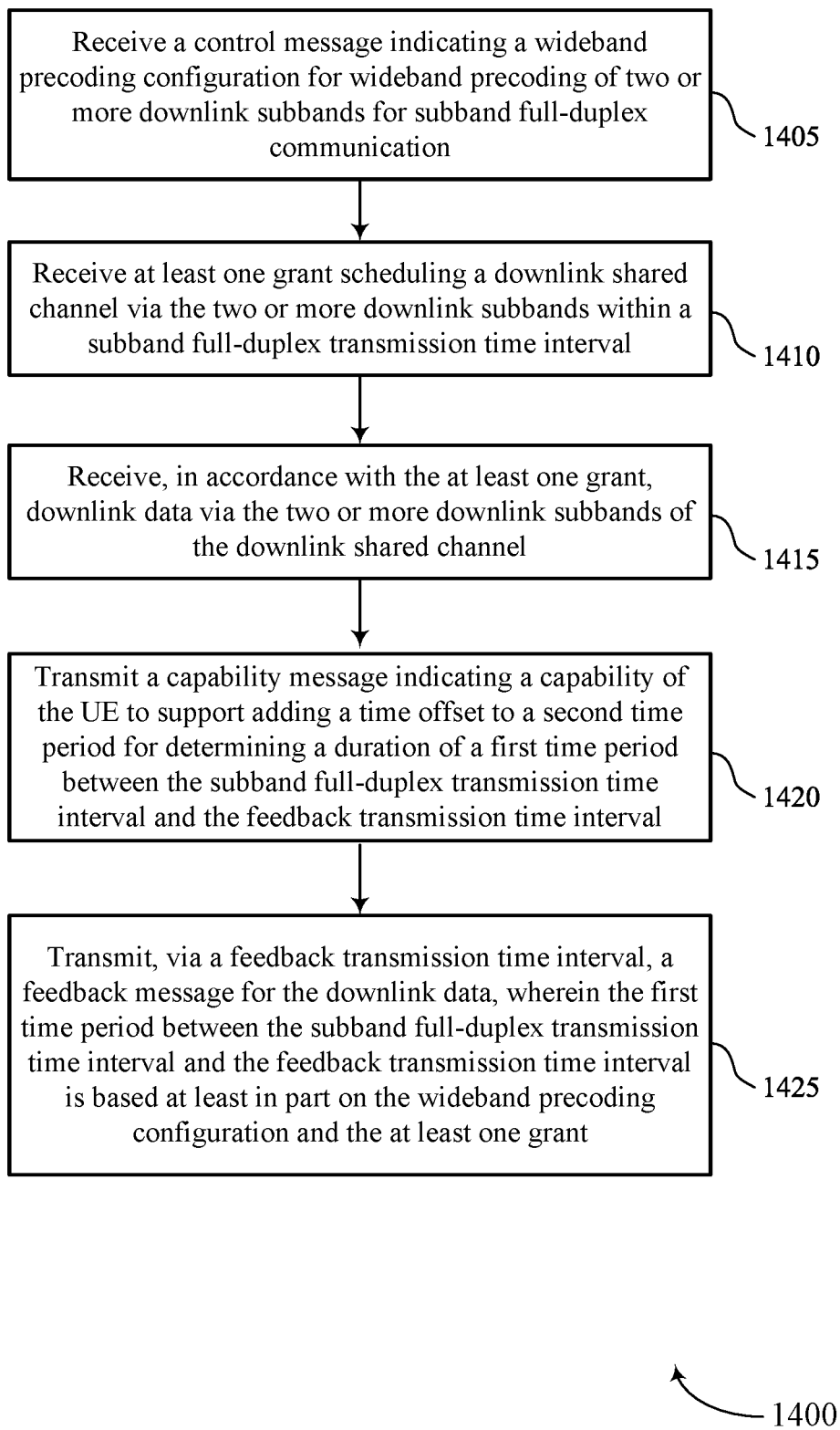

FIG. 14 shows a flowchart illustrating a method 1400 that supports configuring a processing time for wideband precoding in SBFD in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving a control message indicating a wideband precoding configuration for wideband precoding of two or more downlink subbands for SBFD communication. The operations of 1405 may be performed in accordance with examples as disclosed herein. In some examples, aspects of the operations of 1405 may be performed by a wideband precoding component 725 as described with reference to FIG. 7.

At 1410, the method may include receiving at least one grant scheduling a downlink shared channel via the two or more downlink subbands within a SBFD TTI. The operations of 1410 may be performed in accordance with examples as disclosed herein. In some examples, aspects of the operations of 1410 may be performed by a grant component 730 as described with reference to FIG. 7.

At 1415, the method may include receiving, in accordance with the at least one grant, downlink data via the two or more downlink subbands of the downlink shared channel. The operations of 1415 may be performed in accordance with examples as disclosed herein. In some examples, aspects of the operations of 1415 may be performed by a downlink data component 735 as described with reference to FIG. 7.

At 1420, the method may include transmitting a capability message indicating a capability of the UE to support adding a time offset to a second time period for determining a duration of a first time period between the SBFD TTI and the feedback TTI. The operations of 1420 may be performed in accordance with examples as disclosed herein. In some examples, aspects of the operations of 1420 may be performed by a capability message component 745 as described with reference to FIG. 7.

At 1425, the method may include transmitting, via a feedback TTI, a feedback message for the downlink data, wherein the first time period between the SBFD TTI and the feedback TTI is based at least in part on the wideband precoding configuration and the at least one grant. The operations of 1425 may be performed in accordance with examples as disclosed herein. In some examples, aspects of the operations of 1425 may be performed by a feedback message component 740 as described with reference to FIG. 7.

Figure 15:
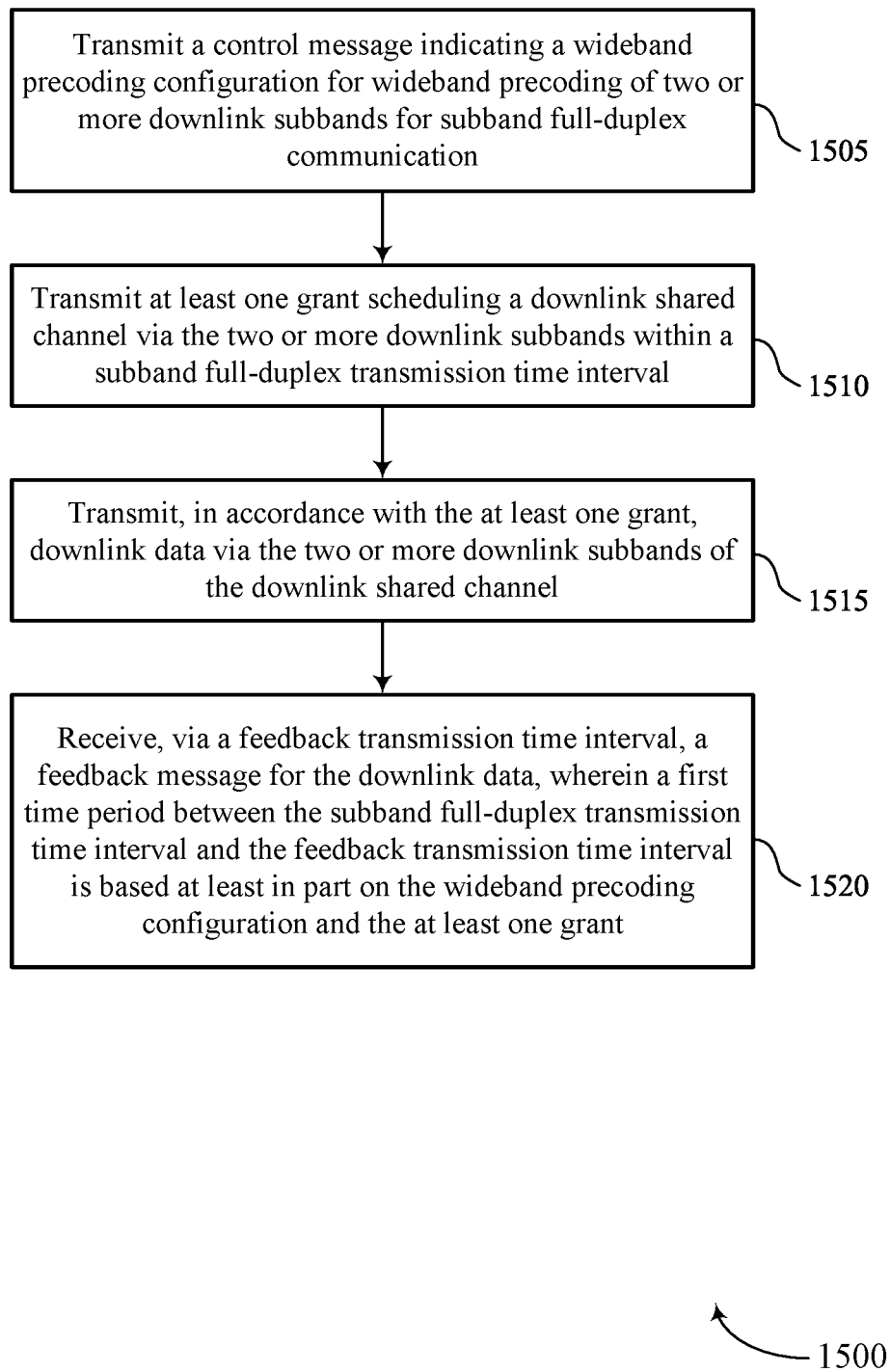

FIG. 15 shows a flowchart illustrating a method 1500 that supports configuring a processing time for wideband precoding in SBFD in accordance with aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting a control message indicating a wideband precoding configuration for wideband precoding of two or more downlink subbands for SBFD communication. The operations of 1505 may be performed in accordance with examples as disclosed herein. In some examples, aspects of the operations of 1505 may be performed by a wideband precoding manager 1125 as described with reference to FIG. 11.

At 1510, the method may include transmitting at least one grant scheduling a downlink shared channel via the two or more downlink subbands within a SBFD TTI. The operations of 1510 may be performed in accordance with examples as disclosed herein. In some examples, aspects of the operations of 1510 may be performed by a grant manager 1130 as described with reference to FIG. 11.

At 1515, the method may include transmitting, in accordance with the at least one grant, downlink data via the two or more downlink subbands of the downlink shared channel. The operations of 1515 may be performed in accordance with examples as disclosed herein. In some examples, aspects of the operations of 1515 may be performed by a downlink data manager 1135 as described with reference to FIG. 11.

At 1520, the method may include receiving, via a feedback TTI, a feedback message for the downlink data, wherein a first time period between the SBFD TTI and the feedback TTI is based at least in part on the wideband precoding configuration and the at least one grant. The operations of 1520 may be performed in accordance with examples as disclosed herein. In some examples, aspects of the operations of 1520 may be performed by a feedback message manager 1140 as described with reference to FIG. 11.

Figure 16:
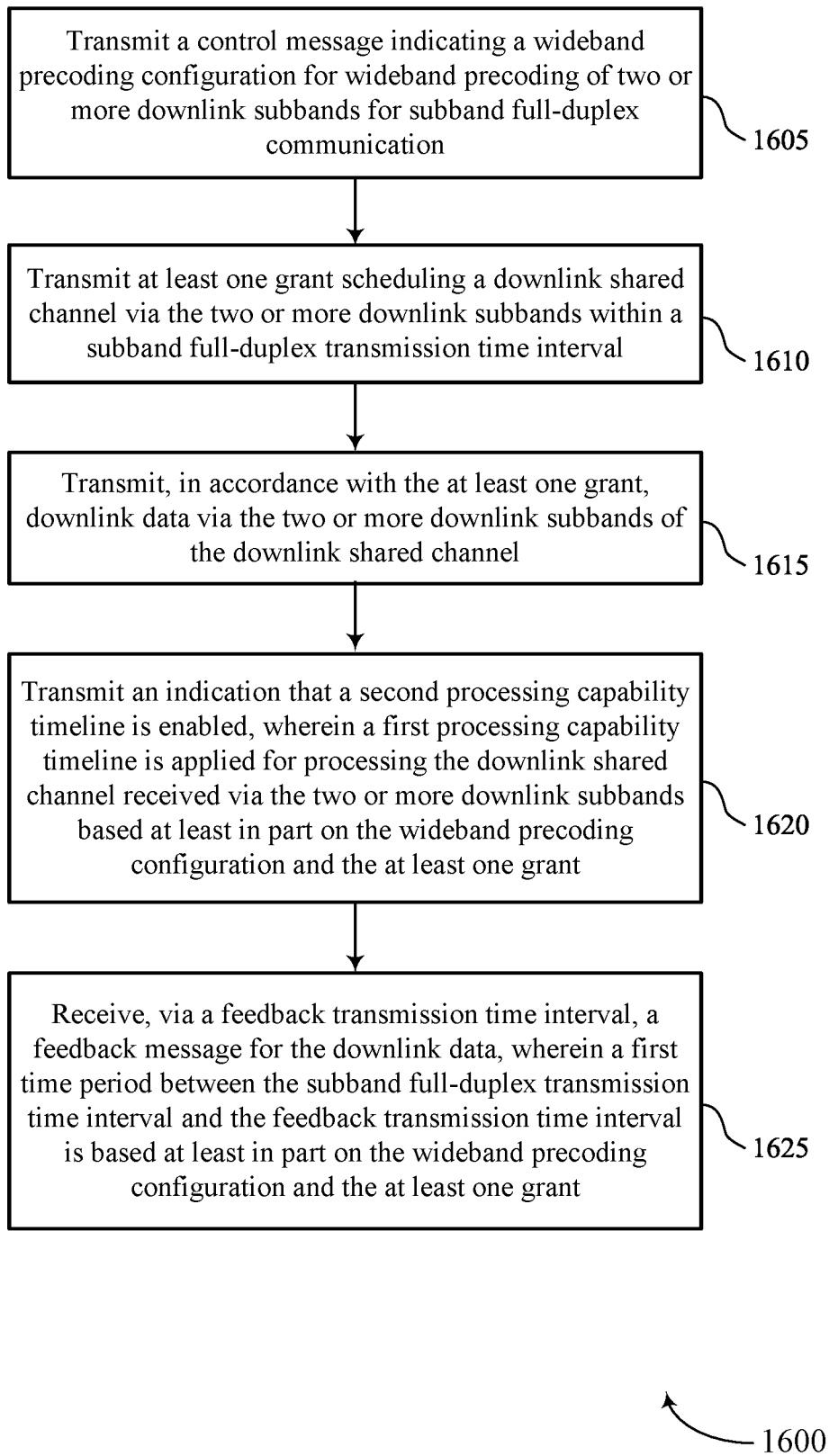

FIG. 16 shows a flowchart illustrating a method 1600 that supports configuring a processing time for wideband precoding in SBFD in accordance with aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include transmitting a control message indicating a wideband precoding configuration for wideband precoding of two or more downlink subbands for SBFD communication. The operations of 1605 may be performed in accordance with examples as disclosed herein. In some examples, aspects of the operations of 1605 may be performed by a wideband precoding manager 1125 as described with reference to FIG. 11.

At 1610, the method may include transmitting at least one grant scheduling a downlink shared channel via the two or more downlink subbands within a SBFD TTI. The operations of 1610 may be performed in accordance with examples as disclosed herein. In some examples, aspects of the operations of 1610 may be performed by a grant manager 1130 as described with reference to FIG. 11.

At 1615, the method may include transmitting, in accordance with the at least one grant, downlink data via the two or more downlink subbands of the downlink shared channel. The operations of 1615 may be performed in accordance with examples as disclosed herein. In some examples, aspects of the operations of 1615 may be performed by a downlink data manager 1135 as described with reference to FIG. 11.

At 1620, the method may include transmitting an indication that a second processing capability timeline is enabled, wherein a first processing capability timeline is applied for processing the downlink shared channel received via the two or more downlink subbands based at least in part on the wideband precoding configuration and the at least one grant. The operations of 1620 may be performed in accordance with examples as disclosed herein. In some examples, aspects of the operations of 1620 may be performed by a processing capability manager 1150 as described with reference to FIG. 11.

At 1625, the method may include receiving, via a feedback TTI, a feedback message for the downlink data, wherein a first time period between the SBFD TTI and the feedback TTI is based at least in part on the wideband precoding configuration and the at least one grant. The operations of 1625 may be performed in accordance with examples as disclosed herein. In some examples, aspects of the operations of 1625 may be performed by a feedback message manager 1140 as described with reference to FIG. 11.

The following provides an overview of aspects of the present disclosure:

Aspect 1: A method for wireless communications at a UE, comprising: receiving a control message indicating a wideband precoding configuration for wideband precoding of two or more downlink subbands for SBFD communication; receiving at least one grant scheduling a downlink shared channel via the two or more downlink subbands within a SBFD TTI; receiving, in accordance with the at least one grant, downlink data via the two or more downlink subbands of the downlink shared channel; and transmitting, via a feedback TTI, a feedback message for the downlink data, wherein a first time period between the SBFD TTI and the feedback TTI is based at least in part on the wideband precoding configuration and the at least one grant.

Aspect 2: The method of aspect 1, wherein a duration of the first time period is calculated using a first non-zero value based at least in part on the wideband precoding configuration and the at least one grant.

Aspect 3: The method of aspect 2, wherein the first non-zero value is based at least in part on a start symbol and an end symbol of the downlink shared channel within the SBFD TTI, a length of the downlink shared channel within the SBFD TTI in time, a location of one or more demodulation reference symbols within the SBFD TTI, a size of the downlink shared channel in each downlink subband of the two or more downlink subbands, or any combination thereof.

Aspect 4: The method of any of aspects 1 through 3, further comprising: transmitting a capability message indicating a capability of the UE to support adding a time offset to a second time period for determining a duration of the first time period.

Aspect 5: The method of any of aspects 1 through 4, wherein a time offset is added to the first time period for determining a duration of the first time period based at least in part on the wideband precoding configuration and the at least one grant.

Aspect 6: The method of any of aspects 1 through 5, wherein receiving the control message comprises: receiving an indication that a second processing capability timeline is enabled, wherein a first processing capability timeline is applied for processing the downlink shared channel received via the two or more downlink subbands based at least in part on the wideband precoding configuration and the at least one grant.

Aspect 7: The method of any of aspects 1 through 6, wherein a first processing capability timeline is applied for processing the downlink shared channel received via the two or more downlink subbands based at least in part on a quantity of RBs within the SBFD TTI failing to satisfy a threshold.

Aspect 8: The method of aspect 7, wherein the quantity of RBs within the SBFD TTI includes a total quantity of scheduled RBs within the two or more downlink subbands.

Aspect 9: The method of any of aspects 7 through 8, wherein the quantity of RBs within the SBFD TTI includes a first quantity of scheduled RBs within a first downlink subband of the two or more downlink subbands, the first quantity is greater than a second quantity of scheduled RBs within a second downlink subband of the two or more downlink subbands.

Aspect 10: The method of any of aspects 1 through 9, wherein a second time period between the SBFD TTI and the feedback TTI comprises the first time period and a time offset based at least in part on the wideband precoding configuration and the at least one grant.

Aspect 11: The method of any of aspects 1 through 10, wherein a second time period between the SBFD TTI and the feedback TTI comprises the first time period and a time offset for a plurality of downlink shared channels within the SBFD TTI.

Aspect 12: A method for wireless communications at a network entity, comprising: transmitting a control message indicating a wideband precoding configuration for wideband precoding of two or more downlink subbands for SBFD communication; transmitting at least one grant scheduling a downlink shared channel via the two or more downlink subbands within a SBFD TTI; transmitting, in accordance with the at least one grant, downlink data via the two or more downlink subbands of the downlink shared channel; and receiving, via a feedback TTI, a feedback message for the downlink data, wherein a first time period between the SBFD TTI and the feedback TTI is based at least in part on the wideband precoding configuration and the at least one grant.

Aspect 13: The method of aspect 12, wherein a duration of the first time period is calculated using a first non-zero value based at least in part on the wideband precoding configuration and the at least one grant.

Aspect 14: The method of aspect 13, wherein the first non-zero value is based at least in part on a start symbol and an end symbol of the downlink shared channel within the SBFD TTI, a length of the downlink shared channel within the SBFD TTI in time, a location of one or more demodulation reference symbols within the SBFD TTI, a size of the downlink shared channel in each downlink subband of the two or more downlink subbands, or any combination thereof.

Aspect 15: The method of any of aspects 12 through 14, further comprising: receiving a capability message indicating a capability of a UE to support adding a time offset to a second time period for determining a duration of the first time period.

Aspect 16: The method of any of aspects 12 through 15, wherein a time offset is added to the first time period for determining a duration of the first time period based at least in part on the wideband precoding configuration and the at least one grant.

Aspect 17: The method of any of aspects 12 through 16, wherein transmitting the control message comprises: transmitting an indication that a second processing capability timeline is enabled, wherein a first processing capability timeline is applied for processing the downlink shared channel received via the two or more downlink subbands based at least in part on the wideband precoding configuration and the at least one grant.

Aspect 18: The method of any of aspects 12 through 17, wherein a first processing capability timeline is applied for processing the downlink shared channel received via the two or more downlink subbands based at least in part on a quantity of RBs within the SBFD TTI failing to satisfy a threshold.

Aspect 19: The method of aspect 18, wherein the quantity of RBs within the SBFD TTI includes a total quantity of scheduled RBs within the two or more downlink subbands.

Aspect 20: The method of any of aspects 18 through 19, wherein the quantity of RBs within the SBFD TTI includes a first quantity of scheduled RBs within a first downlink subband of the two or more downlink subbands, the first quantity is greater than a second quantity of scheduled RBs within a second downlink subband of the two or more downlink subbands.

Aspect 21: The method of any of aspects 12 through 20, wherein a second time period between the SBFD TTI and the feedback TTI comprises the first time period and a time offset based at least in part on the wideband precoding configuration and the at least one grant.

Aspect 22: The method of any of aspects 12 through 21, wherein a second time period between the SBFD TTI and the feedback TTI comprises the first time period and a time offset for a plurality of downlink shared channels within the SBFD TTI.

Aspect 23: A UE for wireless communications, comprising at least one processor; and memory coupled (e.g., operatively, communicatively, functionally, electronically, or electrically) with the at least one processor, the memory storing instructions executable by the at least one processor (e.g., directly, indirectly, after pre-processing, without pre-processing) to cause the UE to perform a method of any of aspects 1 through 11.

Aspect 24: A UE for wireless communications, comprising at least one means for performing a method of any of aspects 1 through 11.

Aspect 25: A non-transitory computer-readable medium storing code for wireless communications, the code comprising instructions executable by at least one processor (e.g., directly, indirectly, after pre-processing, without pre-processing) to perform a method of any of aspects 1 through 11.

Aspect 26: A network entity for wireless communications, comprising at least one processor; and memory coupled (e.g., operatively, communicatively, functionally, electronically, or electrically) with the at least one processor, the memory storing instructions executable by the at least one processor (e.g., directly, indirectly, after pre-processing, without pre-processing) to cause the network entity to perform a method of any of aspects 12 through 22.

Aspect 27: A network entity for wireless communications, comprising at least one means for performing a method of any of aspects 12 through 22.

Aspect 28: A non-transitory computer-readable medium storing code for wireless communications, the code comprising instructions executable by at least one processor (e.g., directly, indirectly, after pre-processing, without pre-processing) to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory (PCM), compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" or "identify" or "identifying" encompasses a variety of actions and, therefore, "determining" or "identifying" can include calculating, computing, processing, deriving, investigating, looking up (such as via looking up in a table, a database or another data structure), ascertaining and the like. Also, "determining" or "identifying" can include receiving (such as receiving information or signaling, e.g., receiving information or signaling for determining, receiving information or signaling for identifying), accessing (such as accessing data in a memory, or accessing information) and the like. Also, "determining" or "identifying" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
at least one processor; and
memory coupled with the at least one processor, the memory storing instructions executable by the at least one processor to cause the UE to:
receive a control message indicating a wideband precoding configuration for wideband precoding of two or more downlink subbands for subband full-duplex communication;
receive at least one grant scheduling a downlink shared channel via the two or more downlink subbands within a subband full-duplex transmission time interval;
receive, in accordance with the at least one grant, downlink data via the two or more downlink subbands of the downlink shared channel; and
transmit, via a feedback transmission time interval, a feedback message for the downlink data, wherein a first time period between the subband full-duplex transmission time interval and the feedback transmission time interval is based at least in part on the wideband precoding configuration and the at least one grant.

2. The UE of claim 1, wherein a duration of the first time period is calculated using a first non-zero value based at least in part on the wideband precoding configuration and the at least one grant.

3. The UE of claim 2, wherein the first non-zero value is based at least in part on a start symbol and an end symbol of the downlink shared channel within the subband full-duplex transmission time interval, a length of the downlink shared channel within the subband full-duplex transmission time interval in time, a location of one or more demodulation reference symbols within the subband full-duplex transmission time interval, a size of the downlink shared channel in each downlink subband of the two or more downlink subbands, or any combination thereof.

4. The UE of claim 1, wherein the at least one processor is individually or collectively further operable to execute the instructions to cause the UE to:
transmit a capability message indicating a capability of the UE to support adding a time offset to a second time period for determining a duration of the first time period.

5. The UE of claim 1, wherein a time offset is added to the first time period for determining a duration of the first time period based at least in part on the wideband precoding configuration and the at least one grant.

6. The UE of claim 1, wherein, to receive the control message, the at least one processor is individually or collectively operable to execute the instructions to cause the UE to:
receive an indication that a second processing capability timeline is enabled, wherein a first processing capability timeline is applied for processing the downlink shared channel received via the two or more downlink subbands based at least in part on the wideband precoding configuration and the at least one grant.

7. The UE of claim 1, wherein a first processing capability timeline is applied for processing the downlink shared channel received via the two or more downlink subbands based at least in part on a quantity of resource blocks within the subband full-duplex transmission time interval failing to satisfy a threshold.

8. The UE of claim 7, wherein the quantity of resource blocks within the subband full-duplex transmission time interval includes a total quantity of scheduled resource blocks within the two or more downlink subbands.

9. The UE of claim 7, wherein the quantity of resource blocks within the subband full-duplex transmission time interval includes a first quantity of scheduled resource blocks within a first downlink subband of the two or more downlink subbands, wherein the first quantity is greater than a second quantity of scheduled resource blocks within a second downlink subband of the two or more downlink subbands.

10. The UE of claim 1, wherein a second time period between the subband full-duplex transmission time interval and the feedback transmission time interval comprises the first time period and a time offset based at least in part on the wideband precoding configuration and the at least one grant.

11. The UE of claim 1, wherein a second time period between the subband full-duplex transmission time interval and the feedback transmission time interval comprises the first time period and a time offset for a plurality of downlink shared channels within the subband full-duplex transmission time interval.

12. A network entity, comprising:
at least one processor; and
memory coupled with the at least one processor, the memory storing instructions executable by the at least one processor to cause the network entity to:
transmit a control message indicating a wideband precoding configuration for wideband precoding of two or more downlink subbands for subband full-duplex communication;
transmit at least one grant scheduling a downlink shared channel via the two or more downlink subbands within a subband full-duplex transmission time interval;
transmit, in accordance with the at least one grant, downlink data via the two or more downlink subbands of the downlink shared channel; and
receive, via a feedback transmission time interval, a feedback message for the downlink data, wherein a first time period between the subband full-duplex transmission time interval and the feedback transmission time interval is based at least in part on the wideband precoding configuration and the at least one grant.

13. The network entity of claim 12, wherein a duration of the first time period is calculated using a first non-zero value based at least in part on the wideband precoding configuration and the at least one grant.

14. The network entity of claim 13, wherein the first non-zero value is based at least in part on a start symbol and an end symbol of the downlink shared channel within the subband full-duplex transmission time interval, a length of the downlink shared channel within the subband full-duplex transmission time interval in time, a location of one or more demodulation reference symbols within the subband full-duplex transmission time interval, a size of the downlink shared channel in each downlink subband of the two or more downlink subbands, or any combination thereof.

15. The network entity of claim 12, wherein the at least one processor is individually or collectively further operable to execute the instructions to cause the network entity to:
receive a capability message indicating a capability of a user equipment (UE) to support adding a time offset to a second time period for determining a duration of the first time period.

16. The network entity of claim 12, wherein a time offset is added to the first time period for determining a duration of the first time period based at least in part on the wideband precoding configuration and the at least one grant.

17. The network entity of claim 12, wherein, to transmit the control message, wherein the at least one processor is individually or collectively operable to execute the instructions to cause the network entity to:
transmit an indication that a second processing capability timeline is enabled, wherein a first processing capability timeline is applied for processing the downlink shared channel received via the two or more downlink subbands based at least in part on the wideband precoding configuration and the at least one grant.

18. The network entity of claim 12, wherein a first processing capability timeline is applied for processing the downlink shared channel received via the two or more downlink subbands based at least in part on a quantity of resource blocks within the subband full-duplex transmission time interval failing to satisfy a threshold.

19. The network entity of claim 18, wherein the quantity of resource blocks within the subband full-duplex transmission time interval includes a total quantity of scheduled resource blocks within the two or more downlink subbands.

20. The network entity of claim 18, wherein the quantity of resource blocks within the subband full-duplex transmission time interval includes a first quantity of scheduled resource blocks within a first downlink subband of the two or more downlink subbands, wherein the first quantity is greater than a second quantity of scheduled resource blocks within a second downlink subband of the two or more downlink subbands.

21. The network entity of claim 12, wherein a second time period between the subband full-duplex transmission time interval and the feedback transmission time interval comprises the first time period and a time offset based at least in part on the wideband precoding configuration and the at least one grant.

22. The network entity of claim 12, wherein a second time period between the subband full-duplex transmission time interval and the feedback transmission time interval comprises the first time period and a time offset for a plurality of downlink shared channels within the subband full-duplex transmission time interval.

23. A method for wireless communications at a user equipment (UE), comprising:
receiving a control message indicating a wideband precoding configuration for wideband precoding of two or more downlink subbands for subband full-duplex communication;
receiving at least one grant scheduling a downlink shared channel via the two or more downlink subbands within a subband full-duplex transmission time interval;
receiving, in accordance with the at least one grant, downlink data via the two or more downlink subbands of the downlink shared channel; and
transmitting, via a feedback transmission time interval, a feedback message for the downlink data, wherein a first time period between the subband full-duplex transmission time interval and the feedback transmission time interval is based at least in part on the wideband precoding configuration and the at least one grant.

24. The method of claim 23, wherein a duration of the first time period is calculated using a first non-zero value based at least in part on the wideband precoding configuration and the at least one grant.

25. The method of claim 24, wherein the first non-zero value is based at least in part on a start symbol and an end symbol of the downlink shared channel within the subband full-duplex transmission time interval, a length of the downlink shared channel within the subband full-duplex transmission time interval in time, a location of one or more demodulation reference symbols within the subband full-duplex transmission time interval, a size of the downlink shared channel in each downlink subband of the two or more downlink subbands, or any combination thereof.

26. The method of claim 23, further comprising:
transmitting a capability message indicating a capability of the UE to support adding a time offset to a second time period for determining a duration of the first time period.

27. A method for wireless communications at a network entity, comprising:
transmitting a control message indicating a wideband precoding configuration for wideband precoding of two or more downlink subbands for subband full-duplex communication;
transmitting at least one grant scheduling a downlink shared channel via the two or more downlink subbands within a subband full-duplex transmission time interval;
transmitting, in accordance with the at least one grant, downlink data via the two or more downlink subbands of the downlink shared channel; and
receiving, via a feedback transmission time interval, a feedback message for the downlink data, wherein a first time period between the subband full-duplex transmission time interval and the feedback transmission time interval is based at least in part on the wideband precoding configuration and the at least one grant.

28. The method of claim 27, wherein a duration of the first time period is calculated using a first non-zero value based at least in part on the wideband precoding configuration and the at least one grant.

29. The method of claim 28, wherein the first non-zero value is based at least in part on a start symbol and an end symbol of the downlink shared channel within the subband full-duplex transmission time interval, a length of the downlink shared channel within the subband full-duplex transmission time interval in time, a location of one or more demodulation reference symbols within the subband full-duplex transmission time interval, a size of the downlink shared channel in each downlink subband of the two or more downlink subbands, or any combination thereof.

30. The method of claim 27, further comprising:
receiving a capability message indicating a capability of a user equipment (UE) to support adding a time offset to a second time period for determining a duration of the first time period.

* * * * *